United States Patent
Fattal

(10) Patent No.: US 11,048,085 B2
(45) Date of Patent: *Jun. 29, 2021

(54) NEAR-EYE DISPLAY, SYSTEM AND METHOD

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/755,535

(22) PCT Filed: Jun. 30, 2016

(86) PCT No.: PCT/US2016/040582
§ 371 (c)(1),
(2) Date: Feb. 26, 2018

(87) PCT Pub. No.: WO2017/039820
PCT Pub. Date: Mar. 9, 2017

(65) Prior Publication Data
US 2018/0246330 A1    Aug. 30, 2018

Related U.S. Application Data

(60) Provisional application No. 62/214,976, filed on Sep. 5, 2015.

(51) Int. Cl.
*G02B 27/01* (2006.01)
*G02B 5/18* (2006.01)
(Continued)

(52) U.S. Cl.
CPC ....... *G02B 27/0172* (2013.01); *G02B 5/1866* (2013.01); *G02B 6/0036* (2013.01);
(Continued)

(58) Field of Classification Search
CPC .. G02B 6/0036; G02B 6/0038; G02B 6/0058; G02B 27/01–0198; G02B 27/0944;
(Continued)

(56) References Cited

U.S. PATENT DOCUMENTS 5,617,248 A    4/1997  Takahashi et al.
9,335,548 B1*  5/2016  Cakmakci .......... G02B 27/0172
(Continued)

FOREIGN PATENT DOCUMENTS

WO    2013180725 A1    12/2013
WO    2017039825 A      3/2017
WO    2017065819 A1     4/2017

OTHER PUBLICATIONS

International Search Report and Written Opinion (ISRWO) from the International Searching Authority (ISA/KR) dated Oct. 13, 2016 (13 pages) for counterpart parent PCT Application No. PCT/US2016/040582.

(Continued)

*Primary Examiner* — Michelle M Iacoletti
*Assistant Examiner* — Christopher A Lamb, II
(74) *Attorney, Agent, or Firm* — J. Michael Johnson

(57) ABSTRACT

A light concentrating backlight includes a light guide to guide light and a diffraction grating configured to diffractively couple out a portion of the guided light as diffractively coupled-out light and to concentrate the diffractively coupled-out light into an eyebox. A near-eye display system includes the light guide and the diffraction grating, and further includes a light valve array configured to modulate the diffractively coupled-out light to form an image in the eyebox. The formed image is configured to be viewable within the eyebox by a user.

20 Claims, 10 Drawing Sheets

(51) Int. Cl.
*F21V 8/00* (2006.01)
*G02C 7/04* (2006.01)

(52) U.S. Cl.
CPC ......... *G02B 6/0038* (2013.01); *G02B 6/0058* (2013.01); *G02C 7/04* (2013.01); *G02B 2005/1804* (2013.01); *G02B 2027/0174* (2013.01)

(58) Field of Classification Search
CPC .... G02B 2027/0105–0198; G02C 7/04; H04N 9/3126; H04N 9/31–3197; G03B 21/00–64
See application file for complete search history.

(56) References Cited

U.S. PATENT DOCUMENTS

| | | | |
|---|---|---|---|
| 9,552,777 | B2 | 1/2017 | Travis |
| 2003/0067685 | A1 | 4/2003 | Niv |
| 2004/0208466 | A1* | 10/2004 | Mossberg .............. G02B 5/203 385/129 |
| 2006/0227067 | A1* | 10/2006 | Iwasaki ................ G02B 27/017 345/8 |
| 2007/0070504 | A1* | 3/2007 | Akutsu .................... G02B 5/32 359/573 |
| 2007/0242237 | A1 | 10/2007 | Thomas |
| 2008/0310187 | A1 | 12/2008 | Huang |
| 2010/0157400 | A1* | 6/2010 | Dimov ................... G02B 5/188 359/13 |
| 2010/0177388 | A1* | 7/2010 | Cohen ................. G02B 6/0038 359/566 |
| 2011/0157667 | A1 | 6/2011 | Lacoste et al. |
| 2012/0001833 | A1* | 1/2012 | Lindig ................... G09G 3/001 345/8 |
| 2012/0119978 | A1 | 5/2012 | Border et al. |
| 2012/0162549 | A1 | 6/2012 | Gao et al. |
| 2013/0242392 | A1* | 9/2013 | Amirparviz .......... G02B 5/3058 359/485.05 |
| 2013/0258461 | A1 | 10/2013 | Sato et al. |
| 2014/0064655 | A1 | 3/2014 | Nguyen et al. |
| 2014/0071539 | A1 | 3/2014 | Gao |
| 2014/0104685 | A1 | 4/2014 | Bohn et al. |
| 2014/0168260 | A1* | 6/2014 | O'Brien ................. G09G 5/377 345/633 |
| 2014/0268867 | A1 | 9/2014 | Fiorentino et al. |
| 2014/0300840 | A1 | 10/2014 | Fattal et al. |
| 2015/0036068 | A1* | 2/2015 | Fattal ................... G02B 6/0038 349/15 |
| 2015/0234205 | A1* | 8/2015 | Schowengerdt ..... G02B 3/0006 351/159.02 |
| 2016/0091737 | A1 | 3/2016 | Kim et al. |
| 2016/0209656 | A1* | 7/2016 | Urey .................. G02B 27/0172 |
| 2016/0299354 | A1 | 10/2016 | Shtukater |
| 2017/0078652 | A1 | 3/2017 | Hua et al. |
| 2018/0084232 | A1 | 3/2018 | Belenkii et al. |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Huang, Fu-Chung, et al., "The Light Field Steroscope—Immersive Computer Graphics via Factored Near-Eye Field Displays with Focus Cues," SIGGRAPH 2015, 12 pages, Stanford Computational Imaging Lab, computationalimagaing.org.

Lanman, Douglas, et al., "Near-Eye Light Field Displays," ACM Transactions on Graphics (TOG)—Proceedings of ACM—SIGGRAPH Asia, Nov. 2013, 10 pages, vol. 32, Issue 6, Article No. 220.

Hua, Hong, et al., "A 3D integral imaging optical see-through head-mounted display," Optics Express, Jun. 2, 2014, pp. 13484-13491, vol. 22, No. 11, Copyright OSA 2014.

Cheng, Dewen, et al., "Design of a wide-angle, lightweight head-mounted display using free-form optics tiling," Optics Letters, Jun. 1, 2011, pp. 2098-2100. vol. 36, No. 11.

Maimone, et al., Computational Augmented Reality Eyeglasses, IEEE International Symposium on Mixed and Augmented Reality (ISMAR) 2013 Science and Technology Proceedings, Oct. 1, 2013, pp. 29-38.

Ho, et al., Contact lens with integrated inorganic semiconductor devices, IEEE 21st International Conference on Micro Electro Mechanical Systems, 2008, MEMS 2008, Jan. 1, 2008, pp. 403-406.

Lingley, et al., A single-pixel wireless contact lens display, Journal of Micromechanics and Micoengineering, Nov. 22, 2011, 15 pages, vol. 21, No. 12.

Park, et al., Soft, smart contact lenses with integrations of wireless circuits, glucose sensors, and displays, Science Advances (Sci. Adv.), Applied Sciences and Engineering; Jan. 24, 2018, pp. 1-11, vol. 4, No. 1.

* cited by examiner

NEAR-EYE DISPLAY, SYSTEM AND METHOD

CROSS-REFERENCE TO RELATED APPLICATIONS

This application is a U. S. national stage patent application filed under 35 U.S.C. § 371 and claims the benefit of priority to International Patent Application No. PCT/US2016/040582, filed Jun. 30, 2016, which claims priority to U.S. Provisional Patent Application Ser. No. 62/214,976, filed Sep. 5, 2015, the entire contents of which are incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

In addition to being classified as either active or passive, electronic displays may also be characterized according to an intended viewing distance of the electronic display. For example, the vast majority of electronic displays are intended to be located at a distance that is within a normal or 'natural' accommodation range of the human eye. As such, the electronic display may be viewed directly and naturally without additional optics. Some displays, on the other hand, are specifically designed to be located closer to a user's eye than the normal accommodation range. These electronic displays are often referred to as 'near-eye' displays and generally include optics of some form to facilitate viewing. For example, the optics may provide a virtual image of the physical electronic display that is within normal accommodation range to enable comfortable viewing even though the physical electronic display itself may not be directly viewable. Examples of applications that employ near-eye displays include, but are not limited to, head mounted displays (HMDs) and similar wearable displays as well as some head-up displays. Various virtual reality systems as well as augmented reality systems frequently include near-eye displays, since the near-eye display may provide a more immersive experience than conventional displays in such applications.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
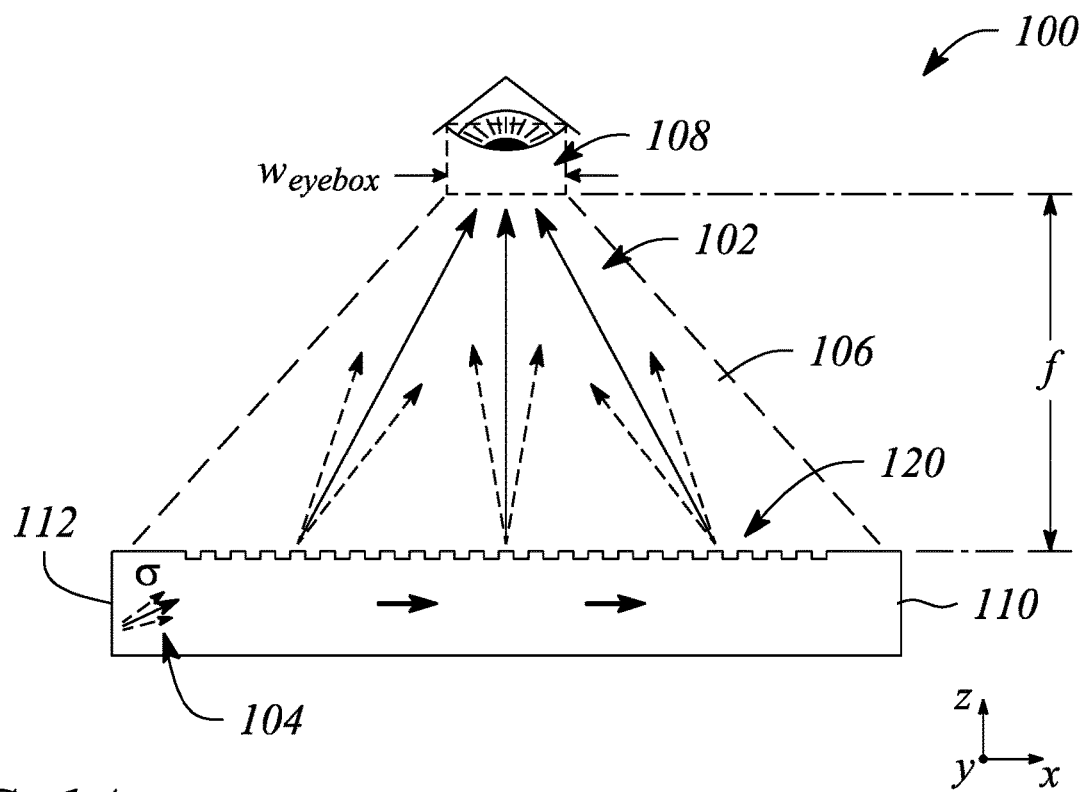
FIG. 1A illustrates a side view of a light concentrating backlight in an example, according to an embodiment consistent with the principles described herein.

Certain examples and embodiments may have other features that are one of in addition to and in lieu of the features illustrated in the above-referenced figures. These and other features are detailed below with reference to the above-referenced figures.

DETAILED DESCRIPTION

Embodiments in accordance with the principles described herein provide a light concentrating backlight with application to near-eye display systems. According to various embodiments, the light concentrating backlight employs a diffraction grating configured to diffractively couple light out of a light guide. Further, the diffraction grating is configured to concentrate the diffractively coupled-out light into an eyebox, according to various embodiments. In some embodiments, the eyebox has a predetermined width, while in other embodiments the eyebox may have both a predetermined width and a predetermined length. According to various embodiments, the light concentrating backlight may be used in a near-eye display system. In particular, near-eye display systems including, but not limited to, augmented reality systems and virtual reality systems may be realized using the light concentrating backlight described herein, according to some embodiments.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

The term 'accommodation' as employed herein refers to a process of focusing upon an object or image element by changing an optical power of the eye. In other words, accommodation is the ability of the eye to focus. Herein, 'accommodation range' or equivalently 'accommodation distance' is defined as a minimum distance of an object from the eye at which a clear or 'in-focus' image of the object can be seen by the eye. In other words, the eye is generally unable to focus clearly on an object that is closer to the eye than the accommodation distance, by definition herein. While accommodation range may vary from one individual to another, herein a minimum 'normal' accommodation distance of about twenty-five (25) centimeters (cm) is assumed, for example, by way of simplicity. As such, for an object to be within a so-called 'normal accommodation range', the object is generally understood to be located greater than about 25 cm from the eye. Further, by definition herein, a near-eye display is a display having at least a portion of the display located closer than 25 cm from the eye of a user of the near-eye display.

Herein, eyebox' is defined as a region or volume of space in which an image formed by a display or other optical system (e.g., lens system) may be viewed. In other words, the eyebox defines a location in space within which a user's eye may be placed in order to view an image produced by the display system. In some embodiments, the eyebox may represent a two dimensional region of space (e.g., a region with length and width but without substantial depth), while in other embodiments, the eyebox may include a three-dimensional region of space (e.g., a region with length, width and depth). Further, while referred to as a 'box', the eyebox may not be restricted to a box that is polygonal or rectangular in shape. For example, the eyebox may comprise a cylindrical region of space, in some embodiments.

Herein, a 'collimation factor,' denoted σ, is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

As used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, the term 'substantially' as used herein means a majority, or almost all, or all, or an amount within a range of about 51% to about 100%, for example. Moreover, examples herein are intended to be illustrative only and are presented for discussion purposes and not by way of limitation.

Figure 1B:
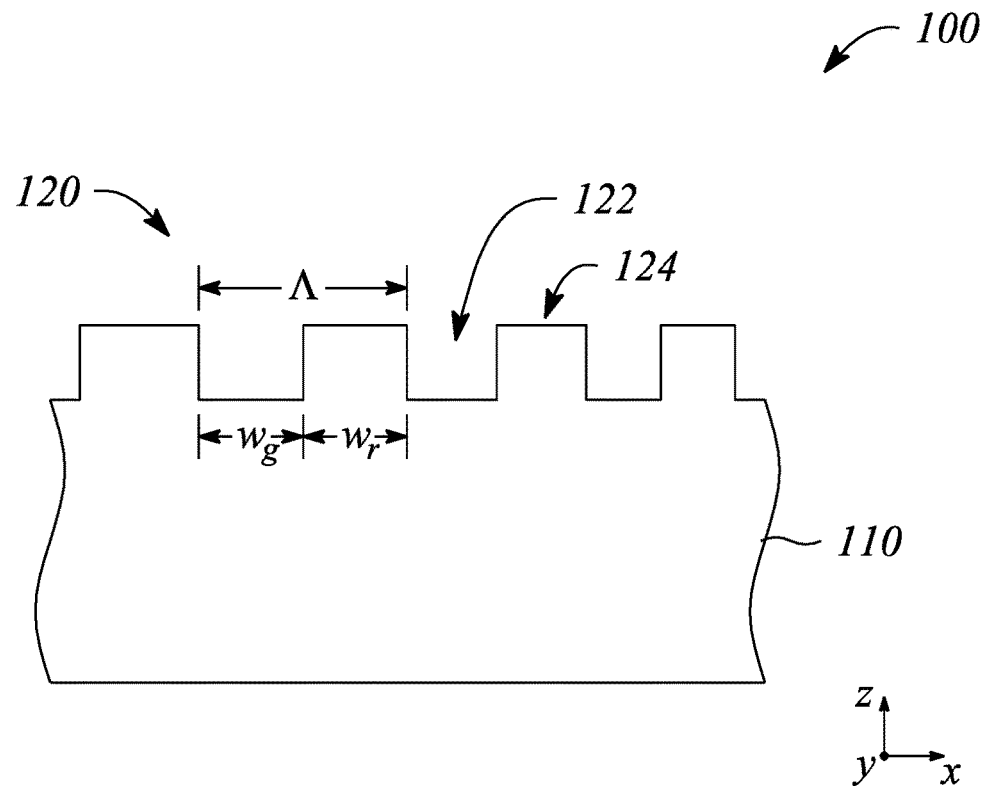
FIG. 1B illustrates a cross-sectional view of a portion of the light concentrating backlight of FIG. 1A in an example, according to an embodiment consistent with the principles described herein.
Figure 1C:
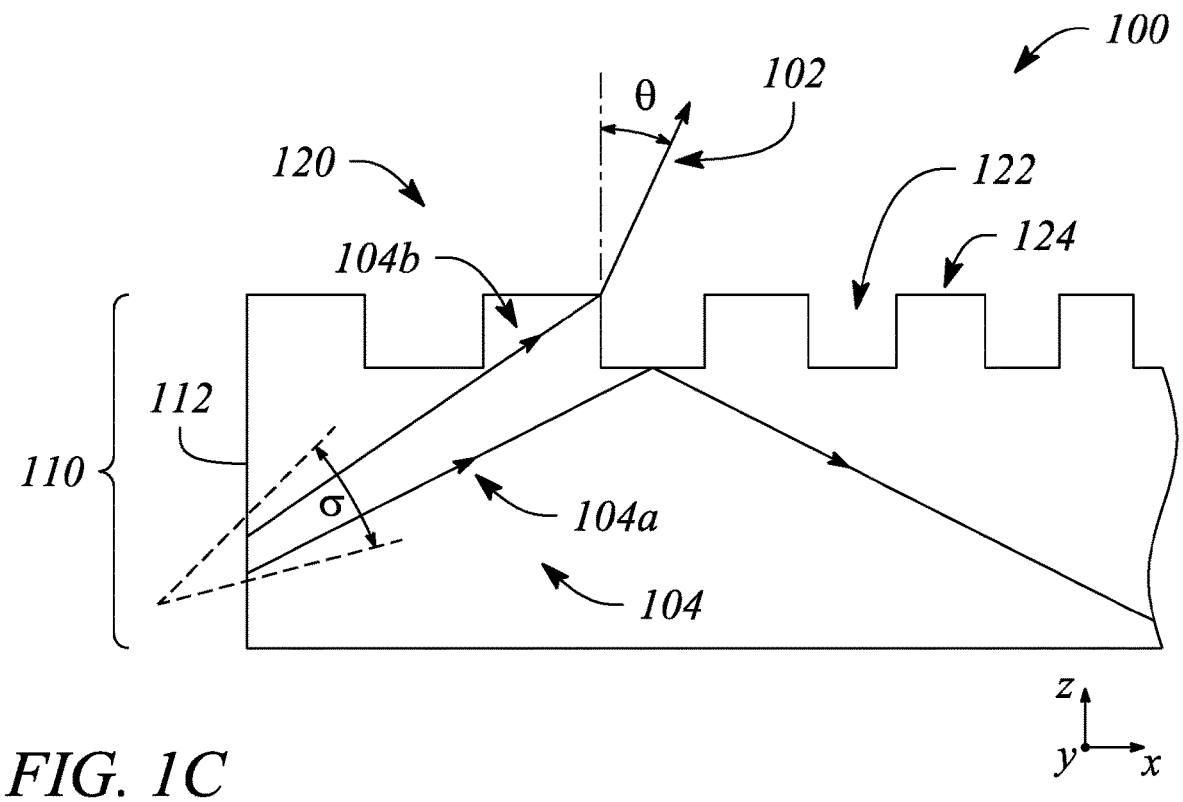
FIG. 1C illustrates a cross-sectional view of another portion of the light concentrating backlight of FIG. 1A in an example, according to an embodiment consistent with the principles described herein.
Figure 1D:
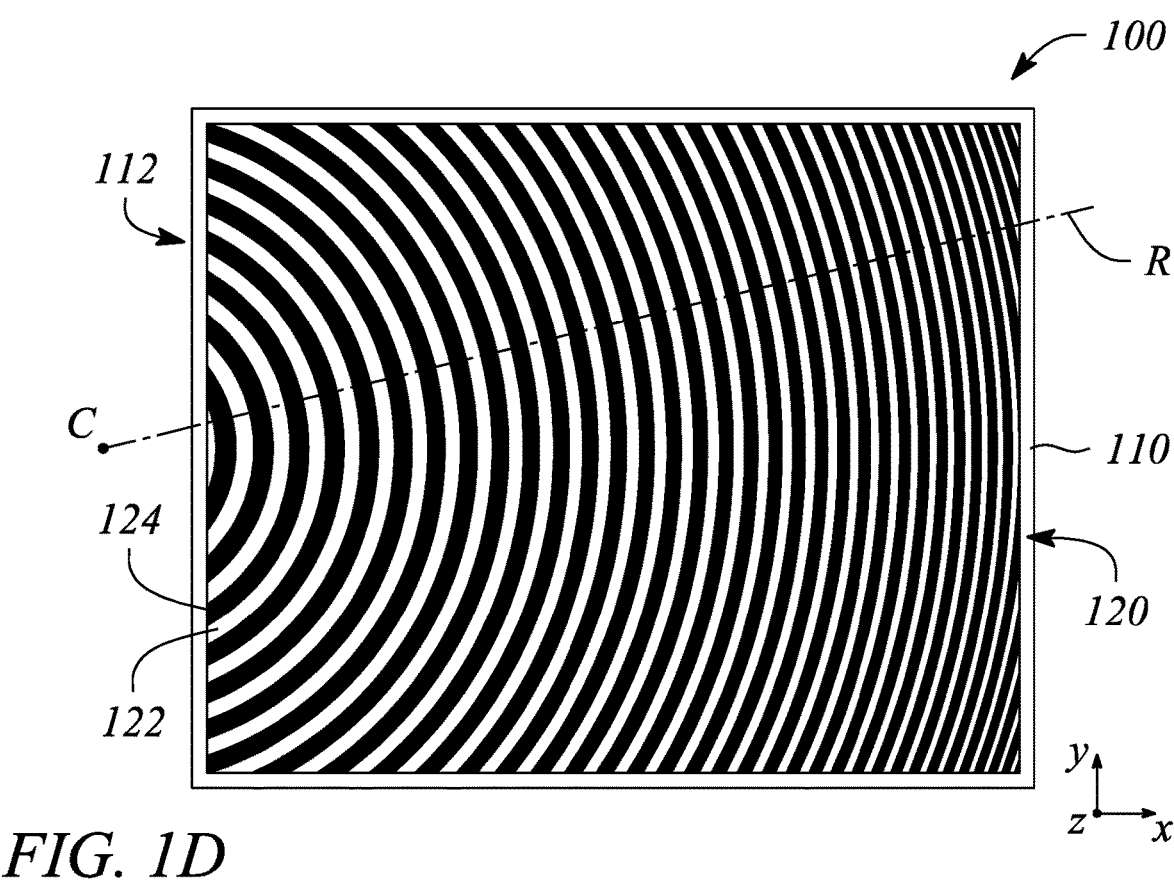
FIG. 1D illustrates a plan view of the light concentrating backlight of FIG. 1A in an example, according to an embodiment consistent with the principles described herein.

In accordance with some embodiments of the principles described herein, a light concentrating backlight is provided. FIG. 1A illustrates a side view of a light concentrating backlight 100 in an example, according to an embodiment consistent with the principles described herein. FIG. 1B illustrates a cross-sectional view of a portion of the light concentrating backlight 100 in FIG. 1A in an example, according to an embodiment consistent with the principles described herein. FIG. 1C illustrates a cross-sectional view of another portion of the light concentrating backlight 100 in FIG. 1A in an example, according to an embodiment consistent with the principles described herein. FIG. 1D illustrates a plan view of the light concentrating backlight 100 of FIG. 1A in an example, according to an embodiment consistent with the principles described herein. As illustrated, the light concentrating backlight 100 is configured to provide or emit light, referred to herein as 'diffractively coupled-out' light 102 that is directed away from the light concentrating backlight 100. Further, the light concentrating backlight 100 is configured to concentrate the provided or emitted light into a predefined region adjacent to (e.g., above) the light concentrating backlight 100. In particular, the diffractively coupled-out light 102 may be concentrated by the light concentrating backlight 100 into an eyebox 108 that is adjacent to the light concentrating backlight 100, as is described in more detail below.

According to various embodiments, the light concentrating backlight 100 illustrated in FIGS. 1A-1D comprises a light guide 110. The light guide 110 may be a plate light guide 110, in some embodiments (e.g., as illustrated herein). The light guide 110 is configured to guide light as guided light 104 (see FIG. 1C). In particular, the guided light 104 may propagate in a longitudinal direction (e.g., an x-direction, as illustrated) along a length of the light guide 110, according to various embodiments. Further, the guided light 104 may propagate generally away from a light-entrance edge 112 of the light guide 110, as illustrated in FIGS. 1A and 1C. In FIG. 1A, arrows within the light guide 110 and pointing away from the light-entrance edge 112 illustrate both the guided light 104 itself and the propagation of the guided light 104 in the longitudinal direction, for example, along the light guide length.

According to various embodiments, the light guide 110 is configured to guide the guided light 104 using or according to total internal reflection. In particular, the light guide 110 may be an optical waveguide comprising an extended, substantially planar sheet or slab of optically transparent, dielectric material. As a plate optical waveguide, the light guide 110 may comprise any one of a number of different optically transparent materials including, but not limited to, various types of glass, such as silica glass, alkali-aluminosilicate glass, borosilicate glass, as well as substantially optically transparent plastics or polymers, such as, but not limited to, poly(methyl methacrylate) or acrylic glass, and polycarbonate. In some embodiments, the light guide 110 may include a cladding layer on at least a portion of a surface of the light guide 110 (not illustrated) to further facilitate total internal reflection.

In various embodiments, light may be coupled into the light guide 110 along the light-entrance edge 112 thereof. In particular, the light may be injected or coupled in at a predetermined angle to propagate within the light guide 110 as the guided light 104. Further, the light may be coupled in at or have a predetermined range of angles or collimation factor σ. That is, the guided light 104 may be collimated light and the range of angles of or defined by the collimation factor σ may represent an angular distribution of light rays within the coupled-in light that ultimately propagates within the plate light guide 110 as the guided light 104. According to various embodiments, the diffractively coupled-out light 102 may include a range of angles substantially similar to or at least determined by the collimation factor σ, or range of angles defined therein. For example, dashed arrows adjacent to solid arrows representing the diffractively coupled-out light 102 in FIG. 1A illustrate a range of angles of various light beams or rays within the diffractively coupled-out light 102.

In an example, the collimation factor σ may represent an angular spread equal to or less than about forty degrees (i.e., σ≤±40°). In other examples, the collimation factor σ may represent an angular spread equal to or less than about thirty degrees (i.e., σ≤±30°), equal to or less than about twenty degrees (i.e., σ≤±20°), equal to or less than about 10 degrees (i.e., σ≤±10°), or equal to or less than about ten degrees (i.e., σ≤±10°). In yet other examples, the collimation factor σ may represent an angular spread that is less than about five degrees (i.e., σ≤±5°), yielding a relatively small eyebox 108, as described below with respect to equation (1). In some embodiments, guided light 104 may be configured to propagate at a non-zero propagation angle (e.g., less than a critical angle of the plate light guide 110) in addition to having the predetermined collimation factor σ.

As illustrated, the light concentrating backlight 100 further comprises a diffraction grating 120. In various embodiments, the diffraction grating 120 is optically coupled to the light guide 110. For example, the diffraction grating 120 may be located on, at or adjacent to a surface of the light guide 110. The surface may be one or both of a 'top' surface (e.g., a light emitting surface) and a 'bottom' surface of the light guide 110, for example. In FIGS. 1A-1D, the diffraction grating 120 is illustrated at the top surface of the light guide 110, by way of example and not limitation.

According to various embodiments, the diffraction grating 120 is configured to diffractively couple out a portion of the guided light 104 from within the light guide 110. In particular, the portion of guided light 104 may be diffractively coupled out as the diffractively coupled-out light 102. Further, the diffraction grating 120 is configured to concentrate the diffractively coupled-out light in an eyebox 108 located adjacent to and spaced apart from the light guide surface (e.g., above the top surface, as illustrated). For example, FIG. 1A illustrates the diffractively coupled-out light 102 as arrows representing rays or beams of light extending from the light guide surface to the eyebox 108. As illustrated by dashed lines extending from opposite edges or ends of the light guide 110 to the eyebox 108, the diffractively coupled-out light may be concentrated into the predetermined and substantially localized region of space representing the eyebox 108, located adjacent to (i.e., above) the surface of the light guide 110. Moreover, the diffractively coupled-out light 102 may be substantially confined to a region (e.g., a conical/pyramidal region or light-transmission cone 106) between the light guide 110 and the eyebox 108 by the concentrating effects of the diffraction grating 120, according to various embodiments.

The portion of the light concentrating backlight 100 illustrated in the cross-sectional view of FIG. 1B depicts diffractive features of the diffraction grating 120 as ridges 124, that protrude in a z-direction. Further, the ridges 124 are separated from one another by grooves 122, as illustrated. A combination of a groove 122 and an adjacent ridge 124 may be referred to as a 'diffractive feature,' herein. Alternatively, the ridges 124 and grooves 122 themselves may be referred to as diffractive features. A width of a groove 122 is denoted by $w_g$ and a width of a ridge 124 is denoted by $w_r$. A sum of the groove width $w_g$ and the ridge width $w_r$ is defined as a 'feature spacing' herein and is denoted by $\Lambda$, as illustrated. An alternate definition of 'feature spacing' may be a center-to-center distance between an adjacent pair of ridges 124 (separated by a groove 122) or an adjacent pair of grooves 122 (separated by a ridge 124), for example. According to some embodiments (e.g., as shown in FIG. 1D, described below), the widths of the grooves 122 and the ridges 124 may be substantially constant along of a length of the diffractive features (e.g., the length of the grooves 122 and the ridges 124). Further, in some embodiments, the feature spacing $\Lambda$ along the length of the diffractive features may be substantially constant, e.g., also as illustrated in FIG. 1D.

The cross-sectional view of FIG. 1C illustrates a portion of the light concentrating backlight 100, in particular, the light guide 110 near the light-entrance edge 112. As illustrated therein, light that is coupled into the light guide 110 along the light-entrance edge 112 propagates within the light guide 110 as the guided light 104 in the direction indicated by various extended arrows. In particular, some of the guided light 104, 104a is configured to remain within the light guide 110 due to total internal reflection. Other portions of the guided light 104, 104b may be coupled-out by the diffraction grating 120 to become the diffractively coupled-out light 102, as further illustrated FIG. 1C. Additionally, the guided light direction is in a general direction of decreasing feature spacing $\Lambda$ of the diffraction grating 120, as described below.

For example, a extended arrow in FIG. 1C may represent a path of a ray of guided light 104a within the predetermined collimation factor σ that remains substantially trapped within the light guide 110 by total internal reflection. In particular, the path of the ray may 'bounce' or alternate between top and bottom surfaces of the light guide 110, as illustrated. That is, at various points of reflection from opposing top and bottom surfaces, the guided light 104a may strike the opposing surfaces at angles less than a critical angle of the light guide 110. As such, the guided light 104a is trapped by the total internal reflection within the light guide 110.

Another extended arrow in FIG. 1C may represent a path of another ray of guided light 104, 104b within the predetermined collimation factor σ that is coupled-out of the light guide 110 by the diffraction grating 120 as the diffractively coupled-out light 102, e.g., as a ray of diffractively coupled-out light 102. According to various embodiments, the guided light 104b that interacts with the diffraction grating 120 may be diffractively coupled out of the light guide 110 as a first order diffraction beam. That is, the diffraction grating 120 is configured to diffractively couple out the guided light portion according to a first diffraction order. In various embodiments, a zero order diffraction beam of light and higher order diffraction beams of light may be substantially suppressed. For example, the diffractively coupled-out light 102 may represent first order, diffracted light that is diffractively coupled out of the light guide 110 at a diffraction angle θ with respect to a surface normal of the light guide 110.

In some embodiments (not illustrated), the diffraction grating 120 may comprise diffractive features that are substantially straight. Substantially straight diffractive features (e.g., both straight grooves 122 and ridges 124) may provide an eyebox 108 that is substantially one-dimensional. That is, the eyebox 108 may have a width (e.g., in the longitudinal direction) and may further have another dimension (e.g., a length) that is in a direction that is orthogonal to the direction of the width. The other dimension or length may be either substantially unconstrained or constrained by a similar extent of the light guide 110, for example.

In other embodiments, the diffraction grating 120 may comprise curved diffractive features or diffractive features arranged to approximate a curve. The plan view of FIG. 1D illustrates the diffraction grating 120 at the surface of the light guide 110 of the light concentrating backlight 100. A diffraction pattern of the diffraction grating 120 is depicted as alternating black and white bands representing diffractive features of the diffraction grating 120, e.g., one or both of grooves 122 and ridges 124 in a surface of the light guide 110. Further, as illustrated in FIG. 1D, the diffractive features are curved diffractive features by way of example and not limitation. In particular, as shown in FIG. 1D, concentric black and white curved lines represent concentric curved diffractive features (e.g., both of concentric curved ridges and concentric curved grooves) on the light guide surface. The concentric curved diffractive features have a center of curvature C, which is located beyond an edge of the light guide 110. In some embodiments, the curved diffractive features of the diffraction grating 120 may be represented by semicircles (i.e., may be semicircular curved diffractive features), while in other embodiments another substantially non-circular curve may be employed to realize the curved diffractive features. The curve of the diffractive features may be configured to concentrate the diffractively coupled-out light in two orthogonal directions in a plane of the eyebox 108. As such, the curved diffractive features may be configured to provide a two-dimensional eyebox 108. In various embodiments, the two-dimensional eyebox 108 may be located in a plane parallel to the light guide surface (e.g., see FIG. 5B, described below).

According to various embodiments, a feature spacing of the diffractive features in the diffraction grating 120 may vary as a function of distance along the light guide length or in the propagation direction of light within the light guide 110. For example, as shown in the plan view of FIG. 1D, the feature spacing $\Lambda$ of the diffraction grating 120 decreases with increasing distance from the center of curvature C. Equivalently, the feature spacing $\Lambda$ is illustrated decreasing as a function of distance from the light-entrance edge 112 of the light guide 110 in FIG. 1D. The distance from the center of curvature or from the light-entrance edge 112 may be measured along a radius R, for example. The feature spacing $\Lambda$ decrease as a function of distance may be referred to as a 'chirp' and the diffraction grating 120 illustrated in FIG. 1D may be a 'chirped' diffraction grating, for example. Moreover, the decrease in feature spacing $\Lambda$ may represent a linear function of distance, in some embodiments. In other embodiments, the feature spacing may decrease according to another (i.e., non-linear) function of distance including, but not limited to, an exponential function of distance and a hyperbolic function of distance.

Figure 2:
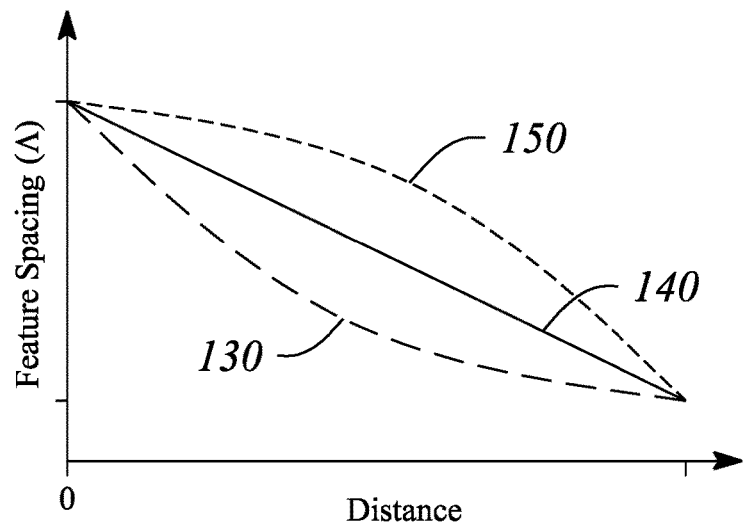
FIG. 2 illustrates a plot of diffractive feature spacing as a function of distance in an example, according to an embodiment consistent with the principles described herein.

FIG. 2 illustrates a plot of diffractive feature spacing as a function of distance in an example, according to an embodiment consistent with the principles described herein. As illustrated, a horizontal axis represents distance (e.g., a radial distance from the center of curvature C) along a radius R in FIG. 1D, e.g., where a point labeled '0' on the horizontal axis may represent an intersection of the radius R and the light-entrance edge 112 of the light guide 110. A vertical axis in the plot represents the feature spacing Λ of the diffraction grating diffractive features. Curves 130, 140 and 150 represent ways in which the feature spacing of the diffractive features may decrease with increasing distance from the center of curvature C. Curve 130 represents an exponential decrease in feature spacing with increasing distance from the center of curvature C. Curve 140 represents a linear decrease in feature spacing as a function of increasing distance from the center of curvature C. Curve 150 represents a hyperbolic decrease in feature spacing with increasing distance from the center of curvature C.

In the example diffraction grating illustrated in FIG. 1D, as well as in various other illustrations herein, cross-sectional views of the diffractive features are represented by rectangular-shaped grooves and ridges for ease of illustration and not by way of limitation. In particular, according to various embodiments, the diffractive features of the diffraction grating 120 may have any of a variety of other cross-sectional shapes including, but not limited to, a saw-tooth shape, a trapezoidal shape, or a hemispherical shape. For example, diffractive features of the diffraction grating 120 may have ridges with a trapezoidal cross section.

According to various embodiments, the diffraction grating 120 may be provided according to any of many different microfabrication or nanoscale fabrication techniques, including but not limited to, wet etching, ion milling, photolithography, imprint lithography, anisotropic etching, plasma etching, or a combination of one or more thereof. For example, as shown in FIGS. 1A-1D, the diffraction grating 120 of the light concentrating backlight 100 may be provided in a surface of a slab of optically transparent, dielectric material of the light guide 110 using ion milling or plasma etching. In another embodiment, the diffraction grating 120 of the light concentrating backlight 100 may be provided by depositing a layer of dielectric material or a metal on a surface of the light guide 110. Depositing the layer may be followed by etching the deposited layer to form the diffraction grating 120, for example. In yet another example, the diffraction grating 120 may be formed in a material layer that is then subsequently affixed to a surface of the light guide 110.

Figure 3A:
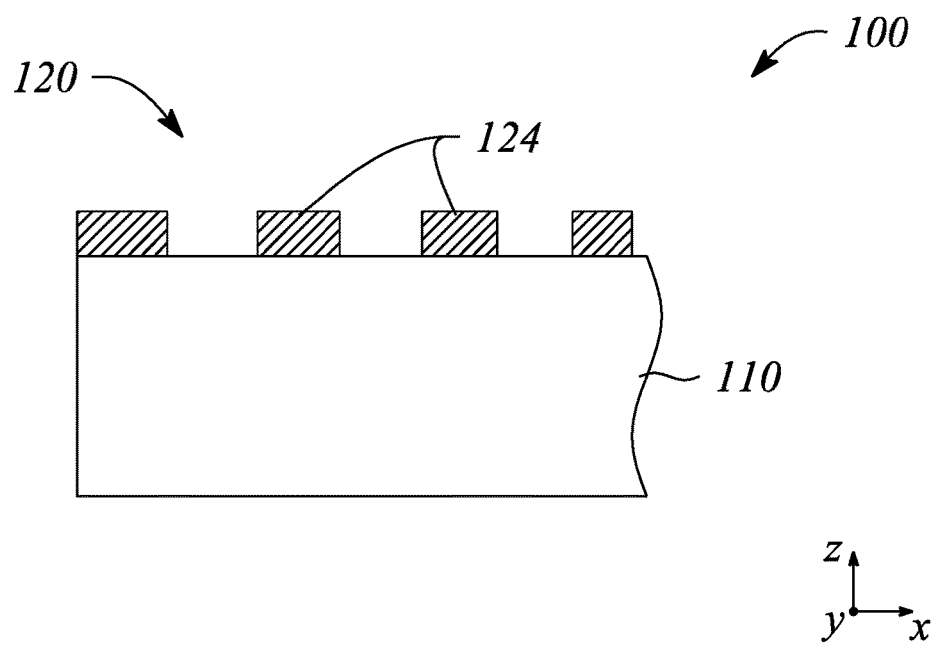
FIG. 3A illustrates a cross-sectional view of a portion of a light concentrating backlight in an example, according to an embodiment consistent with the principles described herein.

FIG. 3A illustrates a cross-sectional view of a portion of a light concentrating backlight 100 in an example, according to an embodiment consistent with the principles described herein. In particular, the illustrated portion of the light concentrating backlight 100 comprises a light guide 110 formed from a slab of dielectric material (i.e., a plate light guide 110). Further illustrated is a diffraction grating 120 at a surface (e.g., a top surface) of the plate light guide 110. The diffraction grating 120 comprises ridges 124 provided on the top surface of the plate light guide 110, as illustrated. According to the embodiment of FIG. 3A, the ridges 124 may comprise a material (i.e., dielectric material or metal) that is different from that of the dielectric material slab of the plate light guide 110, e.g., as illustrated by cross-hatching in FIG. 3A. The different material of the ridges 124 in FIG. 3A may be provided by depositing the material on the top surface of the plate light guide 110, for example. In other embodiments (e.g., as illustrated in FIGS. 1A-1C) the grooves 122 and the ridges 124 may comprise a material of the light guide 110, e.g., the slab of dielectric material.

Figure 3B:
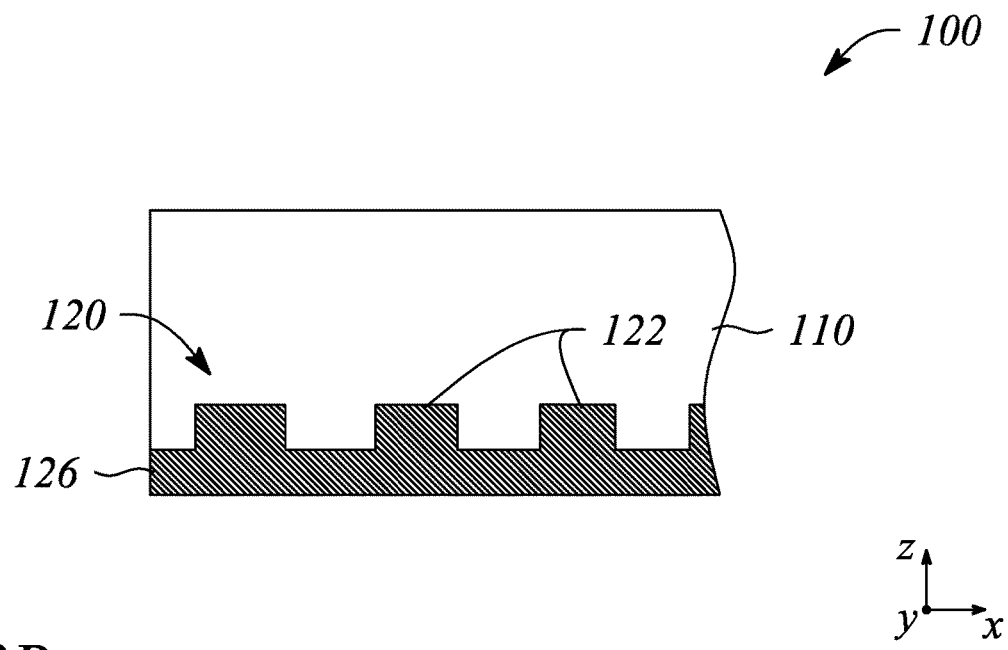
FIG. 3B illustrates a cross-sectional view of a portion of a light concentrating backlight in an example, according to another embodiment consistent with the principles described herein.

In other embodiments, the diffraction grating 120 may be provided at or in a bottom surface of the light guide 110 of the light concentrating backlight 100. FIG. 3B illustrates a cross-sectional view of a portion of a light concentrating backlight 100 in an example, according to another embodiment consistent with the principles described herein. In particular, FIG. 3B illustrates a portion the light concentrating backlight 100 comprising the plate light guide 110 and the diffraction grating 120. However, in FIG. 3B the diffraction grating 120 is provided at a bottom surface of a slab of dielectric material of the plate light guide 110. As illustrated, a layer 126 of material substantially covers the diffractive features (e.g., grooves 122 in the plate light guide material) of the diffraction grating 120 and substantially fills the grooves 122. According to various examples, the material layer 126 may include, but is not limited to, a metal, a reflective material, or a dielectric material with a lower refractive index than the refractive index of the plate light guide 110. The diffraction grating 120 illustrated in FIG. 3B may represent a reflection mode diffraction grating, for example. When the diffraction grating 120 is a reflection mode diffraction grating, the diffractively coupled-out light 102 may exit or be emitted from the light guide 110 through a top surface opposite the bottom surface having the diffraction grating 120.

Figure 3C:
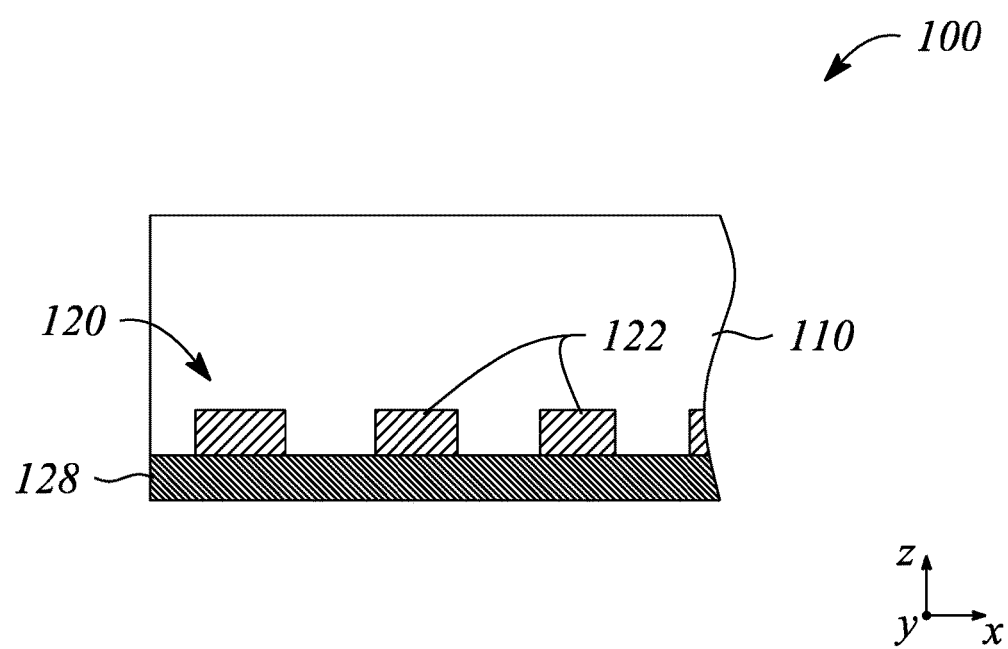
FIG. 3C illustrates a cross-sectional view of a portion of a light concentrating backlight in an example, according to another embodiment of the principles described herein.

FIG. 3C illustrates a cross-sectional view of a portion of the light concentrating backlight 100 in an example, according to another embodiment of the principles described herein. As illustrated in FIG. 3C, the light concentrating backlight portion comprise the plate light guide 110 with the diffraction grating 120 at a bottom surface. In this embodiment, the grooves 122 are filled either with a metal or with a dielectric material having a lower refractive index than the refractive index of the plate light guide 110. Further, a reflective layer 128 (e.g., a metal layer or lower-refractive index dielectric material layer) covers the bottom surface of the plate light guide 110, as illustrated.

Referring again to FIG. 1A, as described above and as illustrated, the feature spacing of the diffraction grating 120 is configured to concentration light at the eyebox 108 located a distance f from the light concentrating backlight 100. For example, the distance f may be measured from the top surface of the light guide 110, as illustrated. According to various embodiments, an approximate width $w_{eyebox}$ of the eyebox 108 may be given by a product of the distance f and the collimation factor σ of the light propagating within the light guide 110 or, equivalently, the collimation factor σ at which light enters the light guide 110 along the light-entrance edge 112. In particular, the eyebox width $w_{eyebox}$ may be given by equation (1) as:

$$w_{eyebox} = f \cdot \sigma \qquad (1)$$

In some embodiments, the eyebox width $w_{eyebox}$ in the longitudinal direction (e.g. light propagation direction) may be less than about twenty-five millimeters (25 mm). An eyebox width $w_{eyebox}$ of 25 mm may correspond to about an average width of an eye of the user viewing either the light concentrating backlight 100 or a display employing the light concentrating backlight 100, for example. In particular, when the user's eye is located within the eyebox 108 to view the light concentrating backlight 100, the user's eye may be substantially similar in size to the eyebox 108, according to some embodiments.

As is discussed above, the diffractively coupled-out light 102 provided by the light concentrating backlight 100 may be substantially concentrated in the eyebox 108 or equivalently substantially concentrated within a conical region or 'light-transmission cone" 106 delineated by dashed lines in FIG. 1A. As a result of the concentration of the diffractively coupled-out light 102, the light produced by the light concentrating backlight 100 may be 'focused' on the user's eye when the user's eye is located within the eyebox 108. For example, the average diameter of a typical human eye is about 25 mm. In some examples, the light concentrating backlight 100 may be configured to provide the eyebox 108 having an eyebox width $w_{eyebox}$ in the range of about fourteen millimeters to about twenty-seven millimeters (14 mm-27 mm) in order to concentrate the light onto the user's eye located in the eyebox 108. In another example, an iris of a typical human eye ranges from about ten millimeters to about thirteen millimeters (10 mm-13 mm) in diameter with an average diameter of the iris being about twelve millimeters (12 mm). In some examples, the light concentrating backlight 100 may be configured to provide an eyebox width $w_{eyebox}$ in a range of about nine millimeters to about fourteen millimeters (9 mm-14 mm) in order to concentrate the diffractively coupled-out light 102 onto the iris of the user's eye located within in the eyebox 108. In yet other examples, the average diameter of a human pupil may range from about 1.5 mm in bright light to about 8 mm in dim light and the light concentrating backlight 100 may be configured to provide the eyebox 108 with an eyebox width $w_{eyebox}$ that is less than about eight millimeters (8 mm) to correspond to the pupil range of between one point five millimeters and eight millimeters (1.5 mm-8 mm).

It may be noted that the action of the diffraction grating 120 of the light concentrating backlight 100 generally confines the diffractively coupled-out light 102 to the light-transmission cone 106 and the eyebox 108. As such, light from the light concentrating backlight 100 may not enter the user's eye when the user's eye is located either outside the eyebox 108 or outside the light-transmission cone 106, according to various embodiments. As such, the light concentrating backlight 100 and in particular the diffraction grating 120 may appear substantially black (i.e., unlit) when viewed from outside the eyebox 108 or from outside the light-transmission cone 106, for example.

The light concentrating backlight 100 may be referred to as a 'near-eye' backlight in that the eyebox 108 may be located nearer than a normal accommodation distance to the light concentrating backlight 100, according to some embodiments. In particular, in some embodiments, the light concentrating backlight 100 as a 'near-eye backlight' may be configured to provide the eyebox 108 at a distance f that is less than about twenty-five centimeters (25 cm) from the light concentrating backlight 100. In other embodiments, the distance f may be less than about a normal accommodation distance from a light valve array located, for example, between the light guide 110 and the eyebox 108, and used to modulate the diffractively coupled-out light 102 and to form an image (e.g., as described below) to be viewed at the eyebox 108. Since the light concentrating backlight 100 concentrates the diffractively coupled-out light 102 in the eyebox 108, a user viewing the image may be able to perceive a focused image when the user's eye is within the eyebox 108, according to various embodiments.

In some embodiments (e.g., as illustrated in FIGS. 1A and 1D), the diffraction grating 120 of the light concentrating backlight 100 may be a single diffraction grating configured to substantially cover a light-emitting portion of the light guide 110. In other embodiments, the diffraction grating 120 of the light concentrating backlight 100 may comprise a plurality of diffraction grating segments, each of which is located in a different region of the light guide 110. In some embodiments, the diffractive grating segments may be separated from one another (i.e., by spaces or areas on the light guide 110 without diffractive features). In various embodiments, the plurality of diffractive grating segments is configured to cooperatively concentrate the diffractively coupled-out light 102 into the eyebox 108.

Figure 4A:
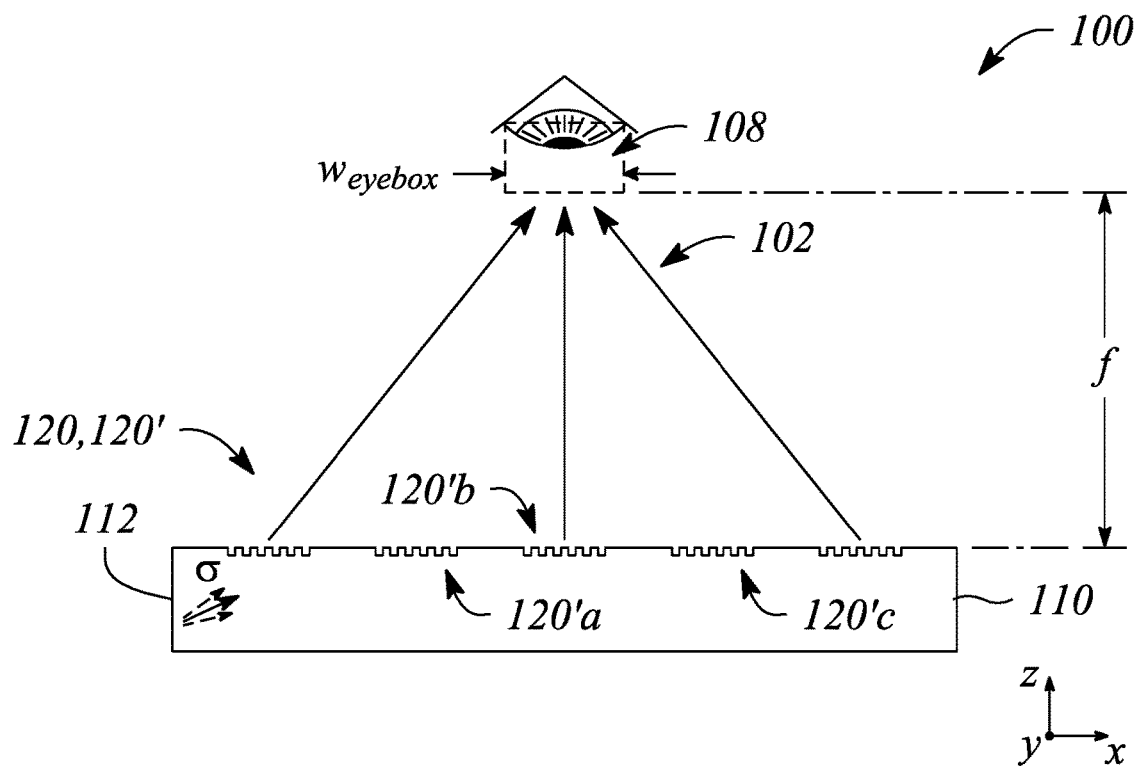
FIG. 4A illustrates a side view of a light concentrating backlight having a plurality diffraction grating segments in an example, according to an embodiment consistent with the principles described herein.

FIG. 4A illustrates a side view of a light concentrating backlight 100 having a plurality diffraction grating segments 120' in an example, according to an embodiment consistent with the principles described herein. In particular, FIG. 4A illustrates the diffraction grating 120 comprising a plurality of diffraction grating segments 120' (with individually labeled segments 120'a, 120'b, 120'c for purposes of discussion below). Further, the diffraction grating segments 120' of the plurality are spaced apart from one another at a surface of a light guide 110, as illustrated. In the light concentrating backlight 100 of FIG. 4A, light may be coupled into the light guide 110 along the light-entrance edge 112 with or having the internal reflection angular diffraction σ. The plurality of diffraction grating segments 120' is configured to diffractively couple out a portion of the light guided in the light guide 110 as the diffractively coupled-out light 102. Further, the diffraction grating segments 120' of the plurality are configured to cooperatively concentrate the diffractively coupled-out light 102 in the eyebox 108 at a distance f from the light guide 110.

Figure 4B:
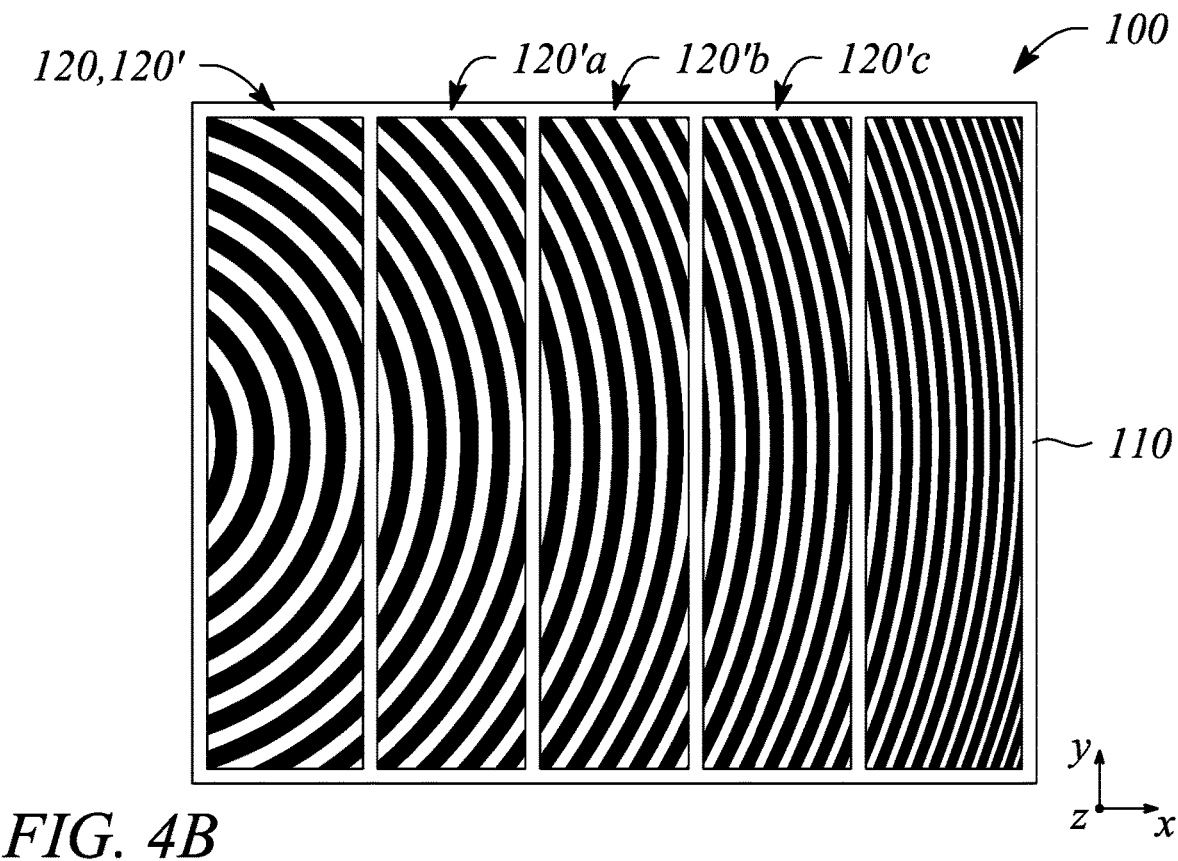
FIG. 4B illustrates a plan view of a light concentrating backlight having a plurality of diffraction grating segments in an example, according to another embodiment consistent with the principles described herein.

FIG. 4B illustrates plan view of a light concentrating backlight 100 having a plurality of diffraction grating segments 120' in an example, according to an embodiment consistent with the principles described herein. The light concentrating backlight 100 illustrated in FIG. 4B may be substantially similar to the light concentrating backlight 100 illustrated in FIG. 4A, for example. In particular, as illustrated in FIG. 4B, the diffraction grating segments 120', e.g., including the individually labeled segments 120'a, 120'b, 120'c, form strips across the light guide surface in a y-direction. Further, as illustrated, spaces are provided between adjacent ones of the strips that form the diffraction grating segments 120'. The spaces may represent un-patterned or un-etched regions of the light guide surface, for example. Together, the diffraction grating segments 120' may approximate a single diffraction grating 120, e.g., substantially similar to a segmented version of the diffraction grating 120 illustrated in FIG. 1D.

Figure 4C:
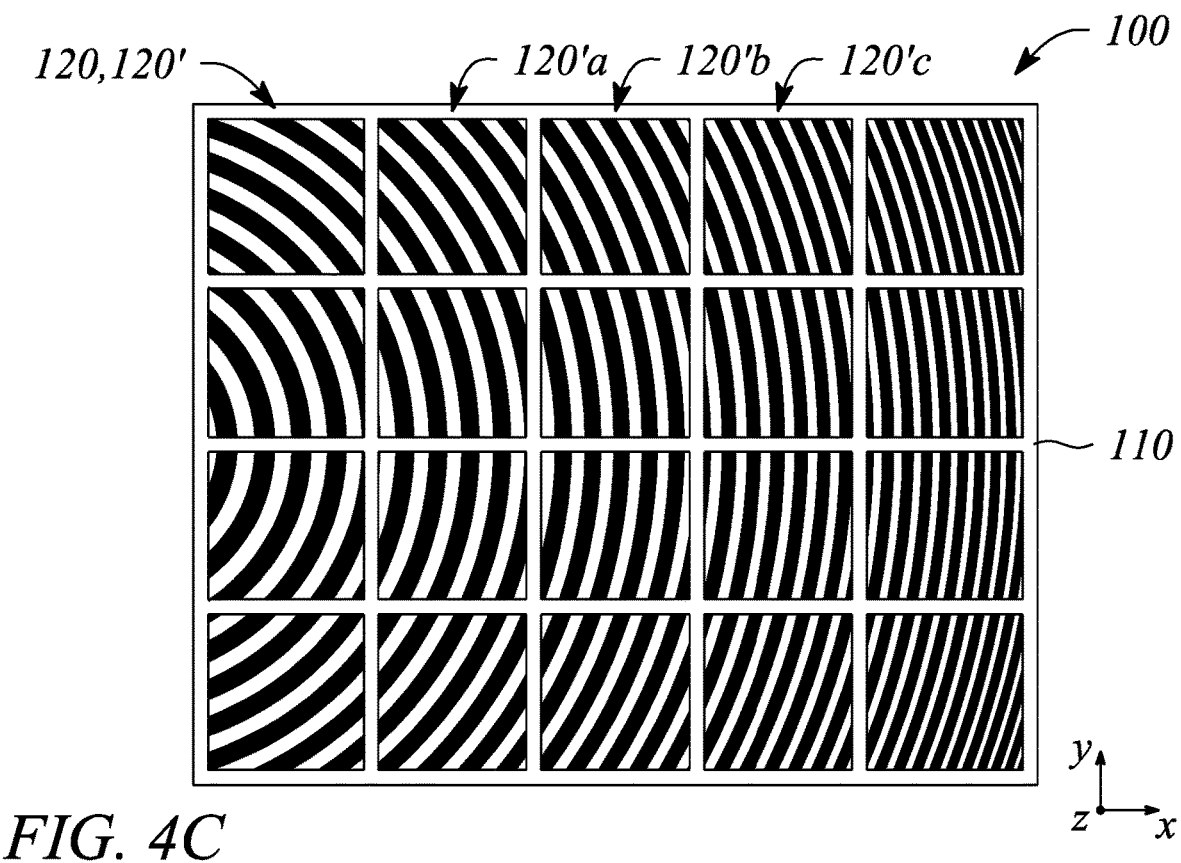
FIG. 4C illustrates a plan view of a light concentrating backlight having a plurality of diffraction grating segments in an example, according to another embodiment consistent with the principles described herein.

FIG. 4C illustrates a plan view of a light concentrating backlight 100 having a plurality of diffraction grating segments 120' in an example, according to another embodiment consistent with the principles described herein. In particular, as illustrated in FIG. 4C, the diffraction grating segments 120' comprise regions (e.g., rectangular regions of one or both of curved grooves and curved ridges) separated by spaces running in both an x-direction and the y-direction. The light concentrating backlight 100 illustrated in FIG. 4C may be substantially similar to the light concentrating backlight 100 illustrated in FIG. 4A, for example. In particular, as illustrated in FIG. 4C, the diffraction grating segments 120', e.g., including the individually labeled segments 120'a, 120'b, 120'c, form a two-dimensional array across the light guide surface in both an x-direction and the y-direction. Also as in FIG. 4B, the diffraction grating segments 120' illustrated in FIG. 4C may approximate a single diffraction grating 120, e.g., that is substantially similar to another segmented version of the diffraction grating 120 illustrated in FIG. 1D.

Figure 4D:
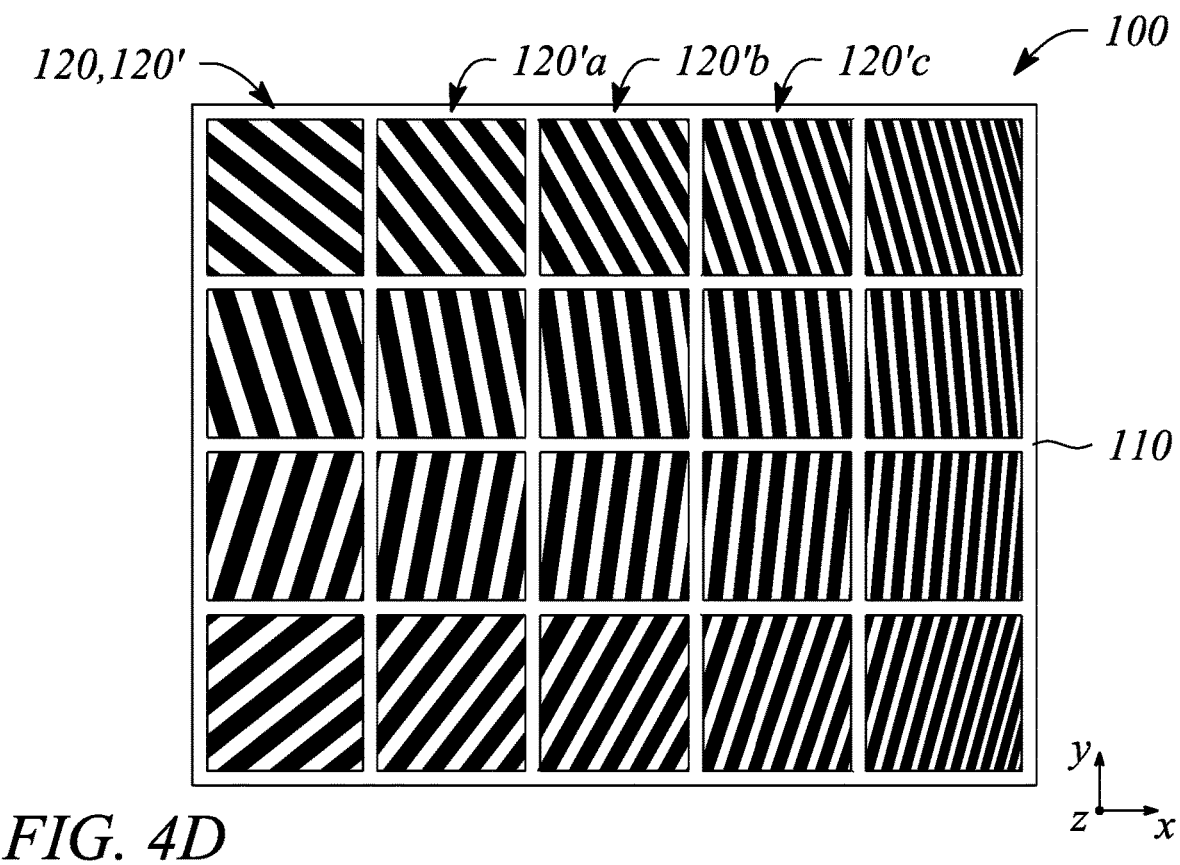
FIG. 4D illustrates a plan view of a light concentrating backlight having a plurality of diffraction grating segments in an example, according to another embodiment consistent with the principles described herein.

In some embodiments, the diffraction grating segments 120' may comprise substantially straight diffractive features arranged on the light guide 110 to approximate curved diffractive features. FIG. 4D illustrates a plan view of a light concentrating backlight 100 having a plurality of diffraction grating segments 120' in an example, according to another embodiment consistent with the principles described herein. As illustrated in FIG. 4D, different ones of the diffraction grating segments 120' have different feature spacing and different diffraction grating orientations that collectively approximate curved (albeit, piece-wise curved) diffractive features of a diffraction grating 120. For example, the approximated curved diffractive features, in combination, may substantially approximate the curved diffractive features of the diffraction grating 120 illustrated in FIG. 1D. Moreover, the light concentrating backlight 100 illustrated in FIG. 4D may be substantially similar to the light concentrating backlight 100 illustrated in FIG. 4A, for example. In particular, as illustrated in FIG. 4D, the diffraction grating segments 120', e.g., including the individually labeled segments 120'a, 120'b, 120'c, form another two-dimensional array across the light guide surface in both the x-direction and the y-direction.

Figure 5A:
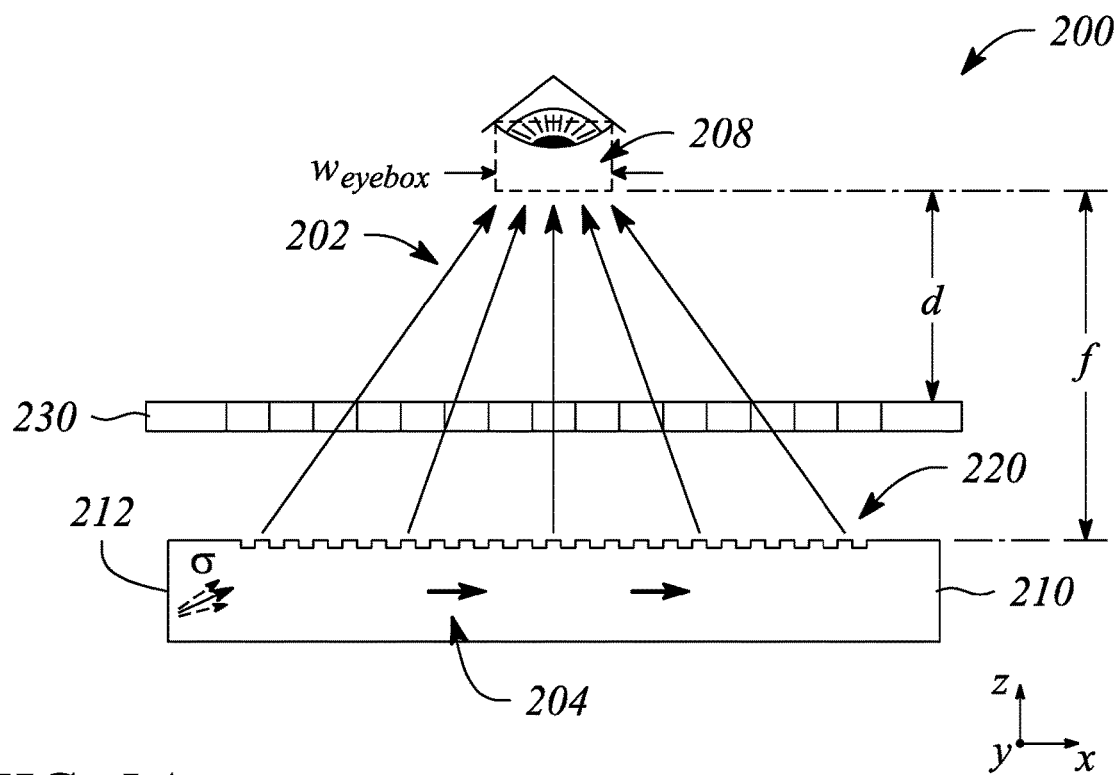
FIG. 5A illustrates a side view of a near-eye display system in an example, according to an embodiment consistent with the principles described herein.
Figure 5B:
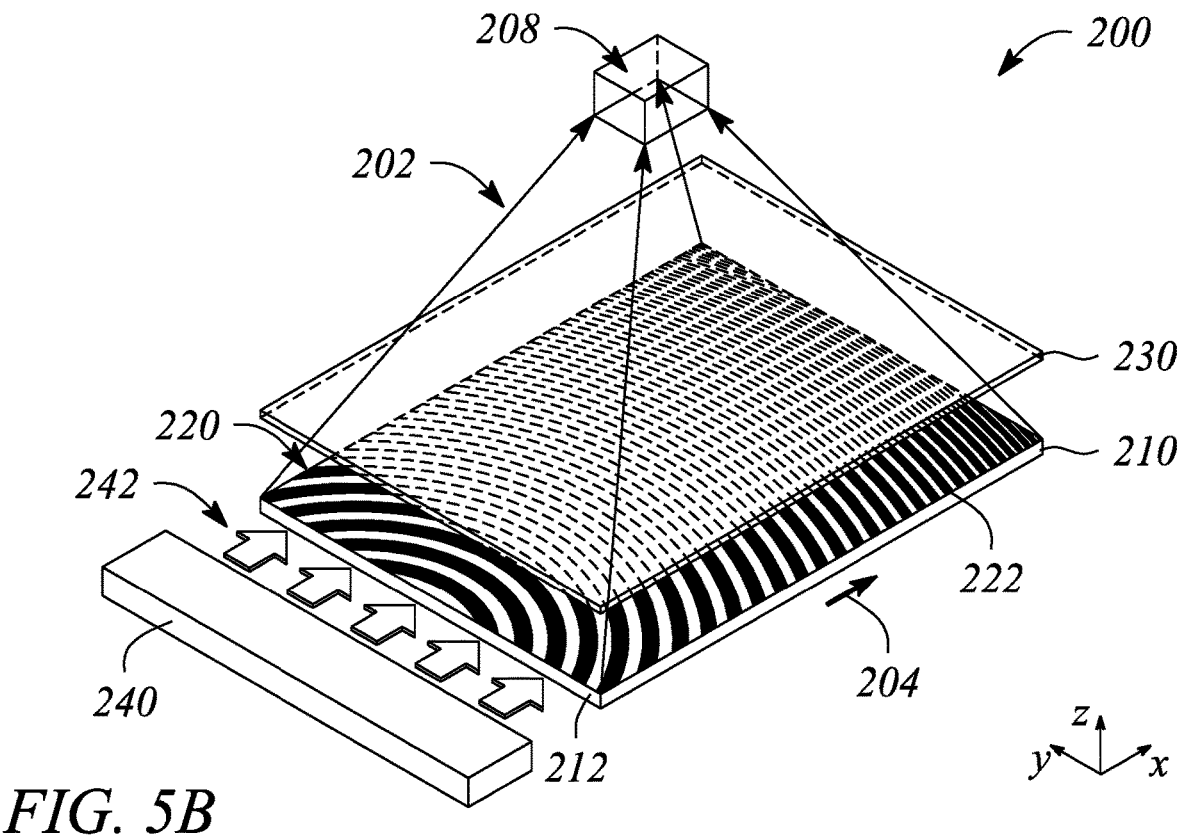
FIG. 5B illustrates a perspective view of a near-eye display system in an example, according to another embodiment consistent with the principles described herein.

In accordance with other embodiments consistent with the principles described herein, a near-eye display system is provided. FIG. 5A illustrates a side view of a near-eye display system 200 in an example, according to an embodiment consistent with the principles described herein. FIG. 5B illustrates a perspective view of a near-eye display system 200 in an example, according to an embodiment consistent with the principles described herein. In some embodiments, the near-eye display system 200 may employ a light concentrating backlight substantially similar to the light concentrating backlight 100, described above. In particular, according to various embodiments, the near-eye display system 200 is configured to provide diffractively coupled-out light 202 and to concentrate the diffractively coupled-out light 202 toward and into an eyebox 208. Further, the near-eye display system 200 is configured to modulate the diffractively coupled-out light 202 to form an image in the eyebox 208. The formed image may be viewable by a user within the eyebox 208, according to various embodiments. Moreover, the eyebox 208 may be a two-dimensional eyebox, as illustrated.

As illustrated in FIGS. 5A and 5B, the near-eye display system 200 comprises a light guide 210. The plate light guide 210 is configured to guide light and in some embodiment may be a plate light guide 210. According to some embodiments, the light guide 210 may be substantially similar to the light guide 110 described above with respect to the light concentrating backlight 100. For example, the light guide 110 may comprise a slab of transparent material configured to guide light by total internal reflection. Further, for example, the light guided by the light guide 210 may have a collimation factor σ.

The near-eye display system 200 illustrated in FIGS. 5A-5B further comprises a diffraction grating 220. The diffraction grating 220 is optically coupled to the light guide 210. Further, the diffraction grating 220 is configured to diffractively couple out a portion of the guided light in the light guide and to concentrate the diffractively coupled-out light 202 toward and into the eyebox 208. According to various embodiments, the eyebox 208 is adjacent to a surface of the light guide 210. According to some embodiments, the diffraction grating 220 may be substantially similar to the diffraction grating 120 of the light concentrating backlight 100, described above. In particular, the diffraction grating 220 comprises a plurality of diffractive features configured both to couple out and to concentrate the diffractively coupled-out light 202 toward and into the eyebox 208. Moreover, the eyebox 208 is located a distance f away from the light guide surface, as illustrated in FIG. 5A. According to some embodiments, the distance f is less than a normal accommodation range (e.g., 25 cm) of an eye of a user of the near-eye display system 200. Further, the diffraction grating 220 may comprise a plurality of diffraction grating segments configured to cooperatively concentrate the diffractively coupled-out light 202 into the eyebox 208, in some embodiments.

In addition, the diffraction grating 220 has diffractive features having a feature spacing between adjacent diffractive features that decreases with increasing distance from a light-entrance edge 212 of the light guide 210. That is, in some embodiments the diffraction grating 220 may be a chirped diffraction grating, substantially similar to some embodiments of the diffraction grating 120, described above. In some embodiments, the diffractive feature spacing decreases as a linear function of distance, while in other embodiments, the decrease represents a substantially non-linear function of distance.

In some embodiments (e.g., as illustrated in FIG. 5B), the diffraction grating 220 comprises curved diffractive features 222. The curved diffractive features 222 (e.g., one or both of curved grooves and curved ridges) may be configured to concentrate the diffractively coupled-out light 202 in two orthogonal directions to provide a two-dimensional (2D) eyebox 208. FIG. 5B illustrates an example 2D eyebox 208 having two orthogonal directions (i.e., an x-direction and a y-direction) located in a plane parallel to light guide surface. Further, arrows representing rays of the diffractively coupled-out light 202 are illustrated converging on and being concentrated at the 2D eyebox 208 as provided by the curved diffractive features 222.

The near-eye display system 200 further comprises a light valve array 230. The light valve array 230 is located between the light guide 210 and the eyebox 208. The light valve array 230 is configured to modulate the diffractively coupled-out light 202 to form an image at or in the eyebox 208. In particular, individual light valves of the light valve array 230 may be independently configured to provide pixels that together form the image at the eyebox 208. In some embodiments, a distance d from the light valve array 230 to the eyebox 208 is less than the normal accommodation distance. That is, one or both of the distance f and the distance d, as illustrated in FIG. 5A, may be less than a normal accommodation distance (e.g., about 25 cm) of an eye of a user of the near-eye display system 200.

According to various embodiments, the formed image may be viewable by a user within the eyebox 208. As such, the user may view the formed image when the user places an eye within the eyebox 208. According to various embodiments, the formed image may not be viewable when the user's eye is outside of the eyebox 208. Further, the concentration of the diffractively coupled-out light 202 in the eyebox 208 may facilitate accommodation by the user's eye to enable the formed image to be viewed in focus even when the eyebox 208 is located less than a normal accommodation distance from one or both of the light guide 210 and the light valve array 230. In particular, since the diffractively coupled-out light 202 modulated by the light valve array 230 to form the image is concentrated or 'focused' in the eyebox 208, the user may still be able to comfortably view the formed image even though the eyebox 208 is less than the normal accommodation distance, according to various embodiments.

According to various embodiments, the light valve array 230 may comprise substantially any of a variety of light valves including, but not limited to, liquid crystal light valves, electrowetting light valves and electrophoretic light valves. Further, as shown in FIGS. 5A and 5B, the light valve array 230 may be oriented substantially parallel to the light guide 210 to intersect a light-transmission cone (or pyramid) formed by the diffractively coupled-out light 202. For example, the light valve array 230 may comprise an array of liquid crystal light valves, each of which may be individually operated as a pixel by modulating an amount of light passing through a light valve. In some embodiments, the light valves may be colored light valves (i.e., a light valve may include a color filter). For example, the light valve array 230 may comprise a plurality of red light valves, a plurality of green light valves, and a plurality of blue light valves. Together the red, green and blue light valves of the light valve array 230 may provide a red-green-blue (RGB) based 'full color' formed image by modulating the diffractively coupled-out light 202, for example. In particular, the diffractively coupled-out light 202 passing through individual ones of light valves of the light valve array 230 may be selectively modulated to create a full color or black and white image that is concentrated on the retina of the viewer's eye when the user's eye is located in the eyebox 208.

In some embodiments (e.g., as illustrated in FIG. 5B), the near-eye display system 200 further comprises a light source 240 optically coupled to the light guide 210. For example, the light source 240 may be optically coupled to the light guide 210 along the light-entrance edge 212, as illustrated in FIG. 5B. The light source 240 is configured to generate and inject light 242 into the light guide 210 as the guided light having the collimation factor σ, according to various embodiments. The light source 240 includes an optical emitter such as, but not limited to, a light emitting diode (LED), an organic LED (OLED), a polymer LED, a plasma-based optical emitter, fluorescent lamp, or an incandescent lamp. According to various embodiments, light output by the light source 240 may comprise monochromatic light or polychromatic light. For example, the light may comprise a single color of light (e.g., red light, green light, or blue light), a plurality of colors of light or light that is substantially white light. As shown in FIGS. 5A-5B, the light 242 from the light source 240 is coupled into the light guide 210 along the light-entrance edge 212 to propagate in a direction 204 within the light guide 210 that is substantially away from the light-entrance edge 212. In other words, the light 242 is coupled into the light guide 210 so that the light 242 propagates within the light guide 210 in the general direction of decreasing feature spacing of the diffractive features of the diffraction grating 220, according to various embodiments.

Figure 6:
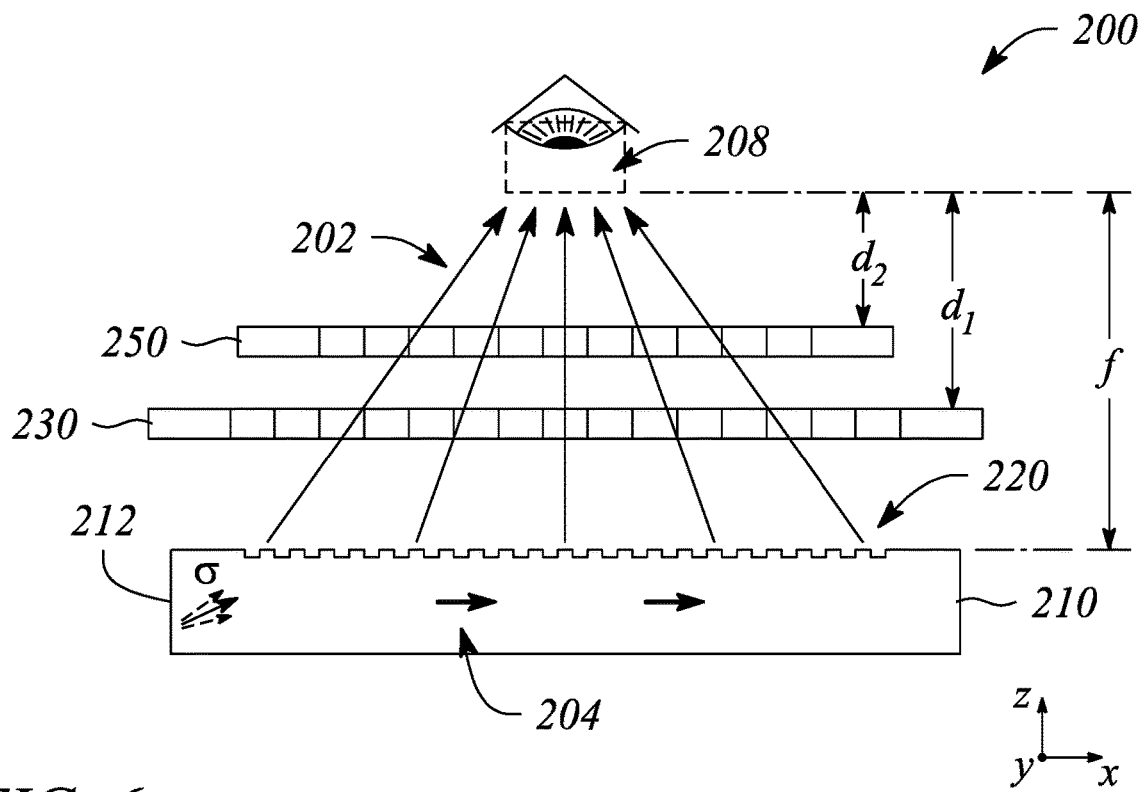
FIG. 6 illustrates a side view of a near-eye display system having two light valve arrays in an example, according to an embodiment consistent with the principles described herein.

In some embodiments, the near-eye display system 200 may include another (e.g., a second) light valve array in addition to the light valve array 230 described above with respect to FIGS. 5A-5B. FIG. 6 illustrates a side view of a near-eye display system 200 having two light valve arrays in an example, according to an embodiment consistent with the principles described herein. As illustrated in FIG. 6, in addition to the light valve array 230 (i.e., a first light valve array 230) the near-eye display system 200 further comprises another light valve array 250 (i.e., a second light valve array 250) located between the light guide 210 and the eyebox 208. In particular, the other light valve array 250 is located between the light valve array 230 and the eyebox 208, as illustrated in FIG. 6 by way of example and not limitation. For example, the other light valve array 250 may be at a distance $d_2$ from the eyebox 208, while the light valve array 230 may be at a distance $d_1$ from the eyebox 208 (e.g., where $d_2 < d_1$), as illustrated in FIG. 6. In some embodiments, the other light valve array 250 may be substantially similar to the light valve array 230. However, the other light valve array 250 may have a lower light valve density or a lower modulation resolution than the light valve array 230, in some embodiments.

According to various embodiments, the other light valve array 250 may be configured to further modulate the diffractively coupled-out light 202 to form the image in the eyebox 208. That is, the other light valve array 250 may further modulate the diffractively coupled-out light 202 that is also modulated by the light valve array 230. As such, the formed image may comprise modulated light from both light valve arrays 230, 250. In some embodiments, the further modulation of the diffractively coupled-out light 202 is configured to provide eye accommodation cues to a user. For example, the light valves in each of the two light valve arrays 230, 250 may be independently controlled to modulate the brightness of light entering a pupil of the user's eye located in the eyebox 208. As a result, a combination of the two light valve arrays 230, 250 may be used to provide eye accommodation by cooperatively displaying objects within the formed image to have different amounts of blur depending on whether the objects displayed on the formed image are intended to appear closer or farther away from the user's eye.

Figure 7:
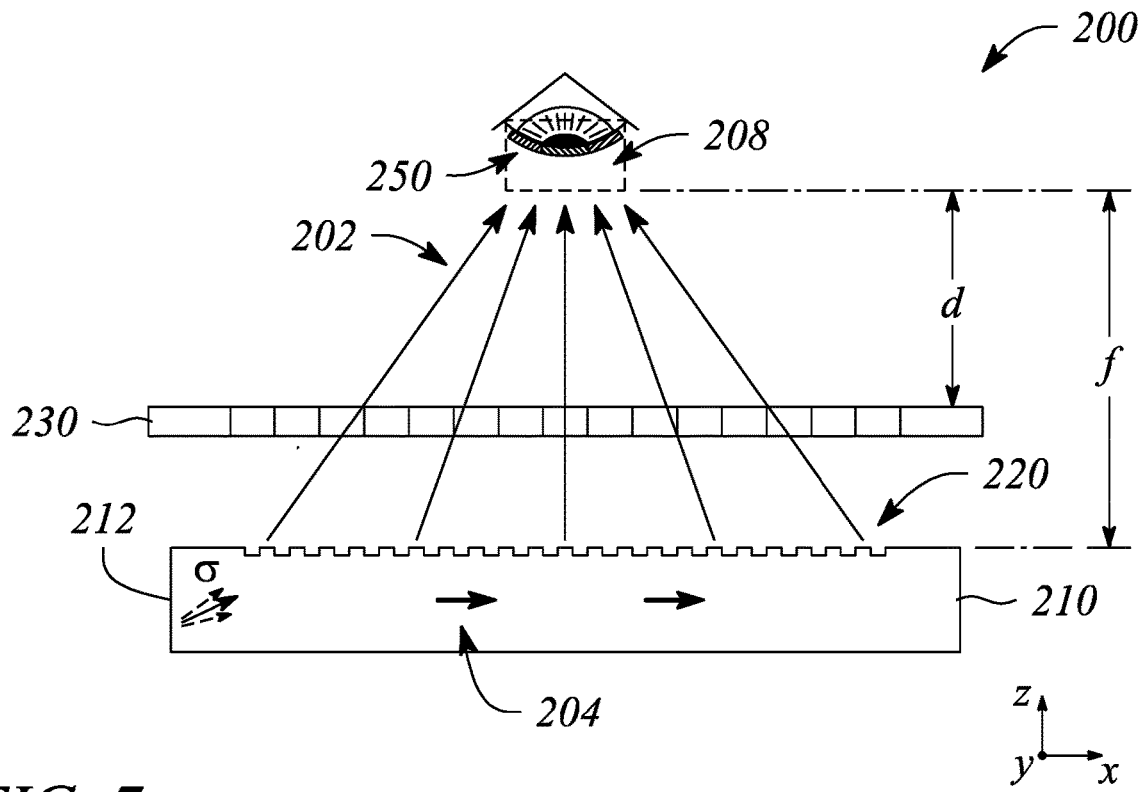
FIG. 7 illustrates a side view of a near-eye display system having two light valve arrays in an example, according to another embodiment consistent with the principles described herein.

In other embodiments, the other light valve array 250 may be a specialized light valve array. FIG. 7 illustrates a side view of a near-eye display system 200 having two light valve arrays in an example, according to another embodiment consistent with the principles described herein. In particular, FIG. 7 illustrates the other light valve array 250 as a specialized light valve array comprising a pixelated contact lens configured to be worn in an eye of the user. According to various embodiments, the pixelated contact lens may have individual light valves (or pixels) that are operatively configured to control an amount of light that enters the user's eye when the user's eye is located within the eyebox 208. By controlling the light entering the user's eye using the individual light valves, accommodation cues may be provided to the user, for example.

For example, the pixelated contact lens comprising the other light valve array 250 may comprise an array of between about two (2) and about nine (9) light valves (i.e., about 2-9 pixels) per pupil area that are operated by turning 'ON' only one light valve (i.e., rendered transparent) at a time, while the remaining light valves are turned 'OFF' (i.e., rendered opaque). The pixelated contact lens may be a 'bionic' lens with independently controlled light valves, for example. In some embodiments, the pixelated contact lens comprising the other light valve array 250 may use liquid crystal light valves to modulate the amount of light that passes through the pixelated contact lens and into the user's eye. In some examples, the light valves in the light valve array 230 and the light valves in the pixelated contract lens of the other light valve array 250 may be independently modulated to control a direction at which the modulated diffractively coupled-out light 202 enters the user's eye. Controlling this direction may also provide eye accommodation cues to the user's eye. For example, by switching 'ON' only one light valve at a time, the direction of light entering the pupil of the user's eye may be changed. The change may enable different formed images to be displayed in different locations on a retina of the user's eye. As a result, a focusing response of the user's eye may be triggered to create an effect of objects being at different distances from the user's eye (i.e., an accommodation response).

According to various embodiments of the principles described herein, the near-eye display system 200 described above may be incorporated into a head-mounted display to provide one or both of virtual reality (VR) images and augmented reality (AR) images to a user. As such, the near-eye display system 200 may be one of an augmented reality (AR) system and a virtual reality (VR) system.

Figure 8:
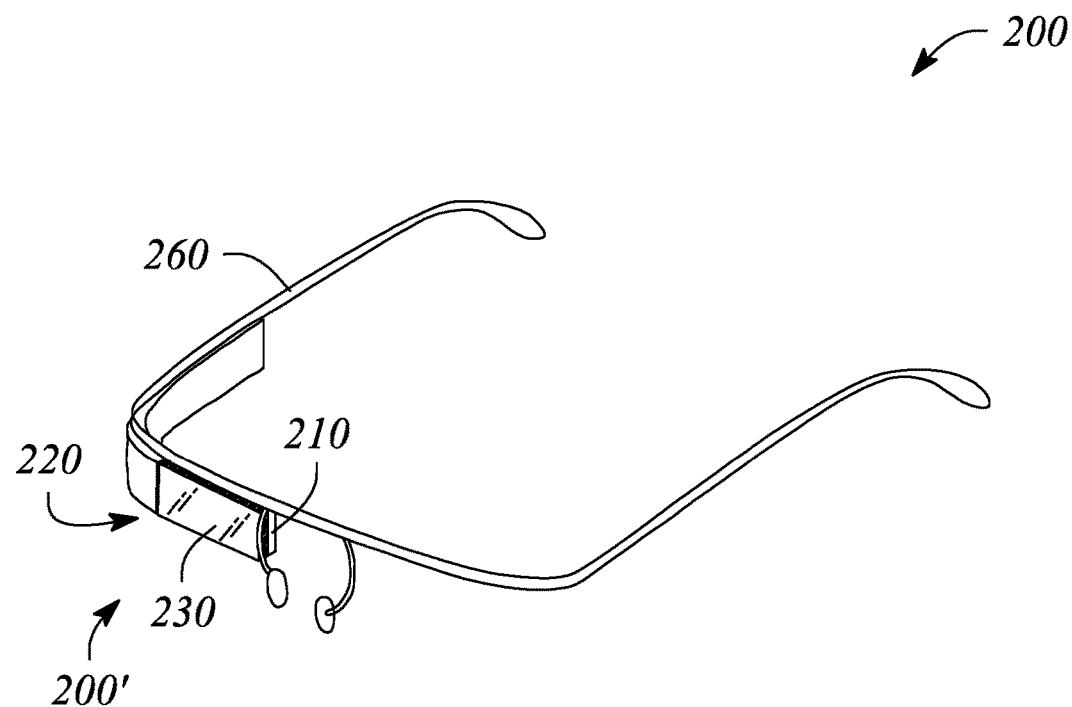
FIG. 8 illustrates a perspective view of near-eye display system configured as a head-mounted display (HMD) in an example, according to an embodiment consistent with the principles described herein.

FIG. 8 illustrates a perspective view of near-eye display system 200 configured as a head-mounted display (HMD) in an example, according to an embodiment consistent with the principles described herein. As illustrated in FIG. 8, the near-eye display system 200 further comprises a headset 260 configured to position the near-eye display system 200 in front of an eye of a user as an HMD. In particular, the headset 260 is configured to hold or position an optical assembly 200' comprising the light guide 210, the diffraction grating 220 and the light valve array 230 in front of the user's eye, e.g., in a field-of-view of the user's eye. Further, the headset 260 is configured to position the eyebox at the user's eye (e.g., at the iris of the user's eye), according to various embodiments. For example, the headset 260 may include a frame resembling a frame of a pair of eyeglasses, as illustrated in FIG. 8. The optical assembly 200' of the near-eye display system 200 may be mounted in the headset frame in place of a lens of the pair of eyeglasses, for example. In FIG. 8, the optical assembly 200' is located in place of one of the lenses and another of the lenses is not illustrated. In some examples, no other lens is included. In other examples, the other lens may be a standard eyeglass lens.

In some embodiments, the optical assembly 200' may be substantially optically transparent in a direction orthogonal to the light guide surface. The optically transparent optical assembly 200' may provide a formed image in the eyebox as an image superimposed on a view of a physical environment beyond the eyebox. In particular, the near-eye display system 200 may be configured to augment a view of the physical environment with the formed image provided within the eyebox. In this configuration, the near-eye display system 200 may serve as an AR display of an AR system, for example.

Figure 9:
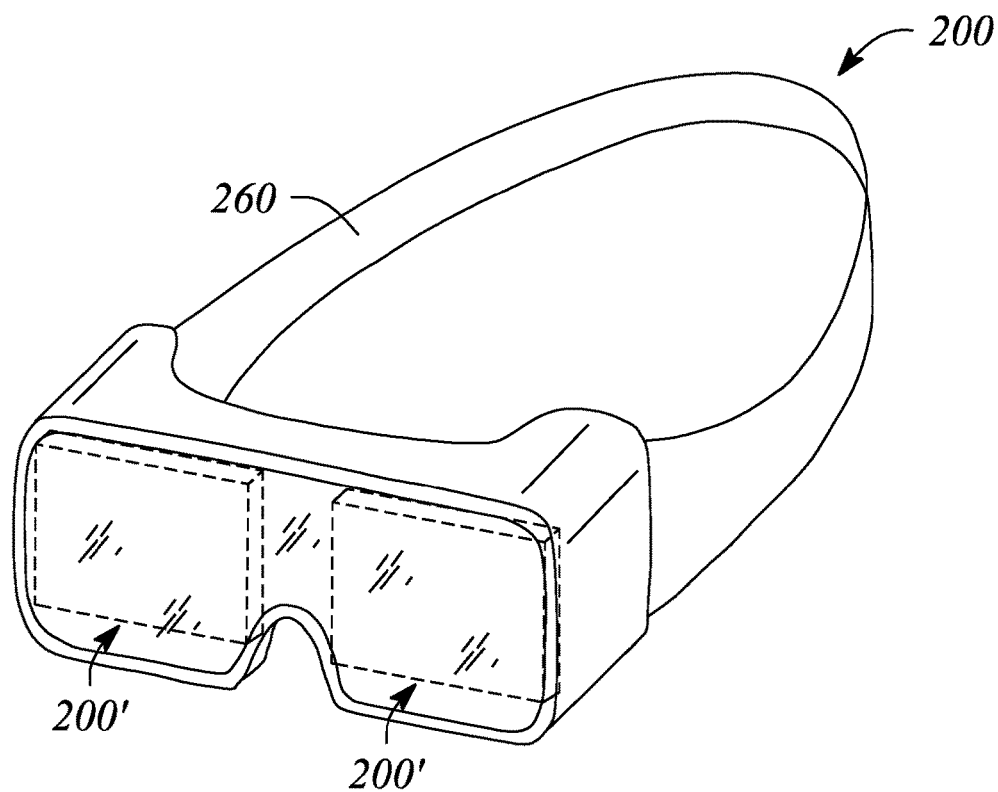
FIG. 9 illustrates a perspective view of near-eye display system configured as a head-mounted display (HMD) in an example, according to another embodiment consistent with the principles described herein.

FIG. 9 illustrates a perspective view of near-eye display system 200 configured as a head-mounted display (HMD) in an example, according to another embodiment consistent with the principles described herein. As illustrated in FIG. 9, the headset 260 may be configured to accommodate a pair of optical assemblies 200'. In particular, each optical assembly 200' of the pair may be positioned in front of a different eye of the user, e.g., one in front of each eye. The headset 260 illustrated in FIG. 9 may resemble a pair of goggles, for example. With the pair of optical assemblies 200', the near-eye display system 200 may provide a stereoscopic pair of formed images to simulate a three-dimensional image for the user. Further, the near-eye display system 200 illustrated in FIG. 9 may serve as a VR display of a VR system by substantially blocking a view of the environment beyond the optical assemblies 200', for example. In particular, the near-eye display system 200 may be configured to supplant or at least substantially supplant a view of a physical environment (i.e., a 'real world' view) with the formed images in each of the eyeboxes, e.g., by blocking a field-of-view of the user's eyes. By supplanting the physical environment view, the user is provided with a virtual reality view provided by the near-eye display system 200 (e.g., the formed images) instead of the physical environment view.

Figure 10:
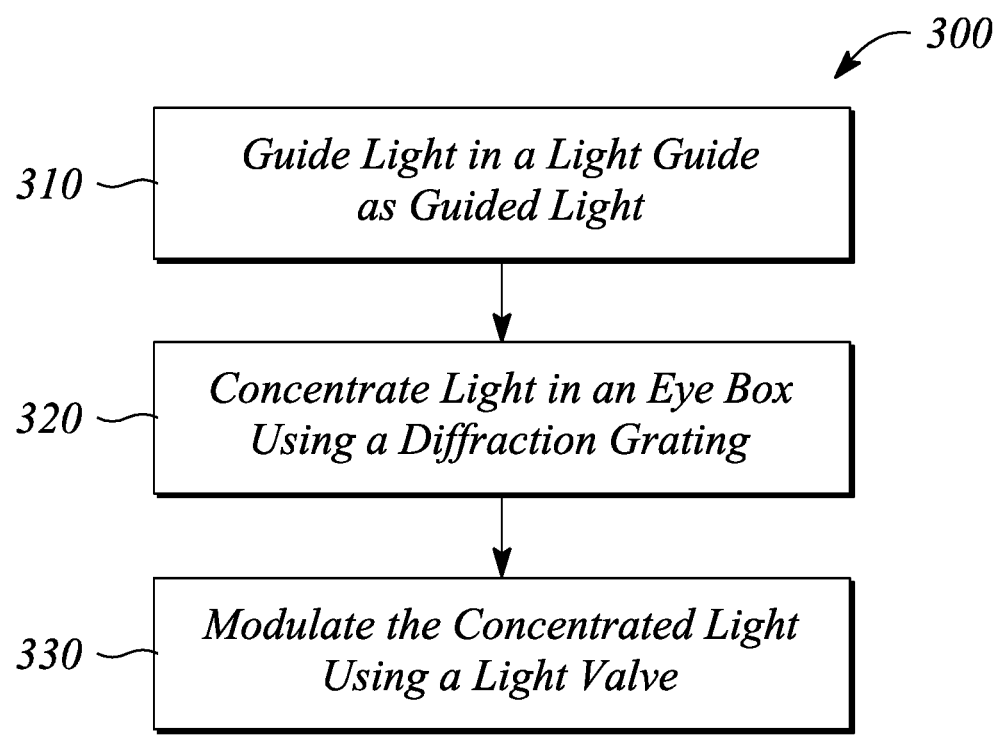
FIG. 10 illustrates a flow chart of a method of near-eye display operation in an example, according to an embodiment consistent with the principles described herein.

In accordance with other embodiments of the principles described herein, a method of near-eye display operation is provided. FIG. 10 illustrates a flow chart of a method 300 of near-eye display operation in an example, according to an embodiment consistent with the principles described herein. As illustrated, the method 300 of near-eye display operation comprises guiding 310 light in a light guide (e.g., a plate light guide) as guided light. In some embodiments, the guided light may be guided 310 along a length of the light guide. For example, the light may be guided in a longitudinal direction. According to some embodiments, the light guide may be substantially similar to the light guide 110 described above with respect to the light concentrating backlight 100. For example, the light guide may be a plate light guide comprising a slab of optically transparent material that is configured to guide 310 light using total internal reflection. Further, the guided light may have a predetermined collimation factor that is substantially similar to the collimation factor σ, described above with respect to the light guide 110.

As illustrated in FIG. 10, the method 300 of near-eye display operation further comprises concentrating 320 light in an eyebox located adjacent to the light guide using a diffraction grating to diffractively couple out and direct a portion of the guided light into the eyebox. The diffraction grating used in concentrating 320 light may be located at a surface of the light guide, in some embodiments. Further, the eyebox into which the light is concentrated 320 may be located adjacent to the light guide surface. In particular, in some embodiments, the eyebox is located at a distance from the light guide surface that is less than a normal accommodation distance of a user's eye. The diffraction grating used in concentrating 320 the light may be substantially similar to the diffraction grating 120 of the light concentrating backlight 100, described above. In particular, the diffraction grating may be a chirped diffraction grating comprising diffractive features having a feature spacing that decreases with increasing distance from a light-entrance edge of the light guide. Further, the diffraction grating may comprise curved diffractive features. The curved diffractive features may be configured to concentrate the diffractively coupled-out light in two orthogonal directions to provide a two-dimensional (2D) eyebox, for example. Further, in some embodiments, the eyebox may be substantially similar to the eyebox 108, described above.

The method 300 of near-eye display operation illustrated in FIG. 10 further comprises modulating 330 the concentrated light using a light valve array. The light valve array is located between the light guide and the eyebox. Modulating 330 the concentrated light forms an image within the eyebox. According to some embodiments, the light valve array used in modulating 330 may be substantially similar to the light valve array 230 described above with respect to the near-eye display system 200. In particular, in some embodiments, a single light valve array may be used in modulating 330 the diffractively coupled-out light. In other embodiments, a pair of light valve arrays may be used in modulating 330 the diffractively coupled-out light.

In some embodiments (not illustrated in FIG. 10), the method of near-eye display operation may further comprise optically coupling light into the light guide at the light-entrance edge as the guided light, for example, using a light source. In some embodiment, the light source may be substantially similar to the light source 240 of the near-eye display system 200, described above. In particular, according to some embodiments, optically coupling light into the light guide may comprise providing the guided light with a predetermined collimation factor, as described above.

Thus, there have been described examples and embodiments of a light concentrating backlight, a near-eye display system and a method of near-eye display operation that provide diffractively couple-out light that is concentrated in an eyebox. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A near-eye display comprising:
   a light guide configured to guide light along a length of the light guide, the light being guided as guided light according to a predetermined collimation factor;
   a diffraction grating at a surface of the light guide, the diffraction grating being both configured to diffractively couple out a portion of the guided light from the light guide as diffractively coupled-out light and configured to concentrate the diffractively coupled-out light into an eyebox located adjacent to and spaced apart from the light guide surface; and
   a light valve array located between the light guide and the eyebox, the light valve array being configured to modulate the diffractively coupled-out light to provide an image in the eyebox and the image being configured to be viewed within the eyebox by a user,
   wherein a combination of an amount of concentration of the diffractively coupled-out light provided by the diffraction grating and the predetermined collimation factor is configured to determine a predetermined width of the eyebox, and wherein the eyebox is a two-dimensional eyebox located in a plane parallel to the light guide surface, the diffraction grating comprising a plurality of curved diffractive features configured to concentrate the diffractively coupled-out light in two orthogonal directions into the parallel plane of the eyebox.

2. The near-eye display of claim 1, wherein the plurality of curved diffractive features comprises one or both of concentric curved ridges and concentric curved grooves having a center of curvature.

3. The near-eye display of claim 1, wherein the diffraction grating comprises diffractive features having a feature spacing between adjacent diffractive features that decreases linearly as a function of distance from a light-entrance edge of the light guide.

4. The near-eye display of claim 1, wherein the diffraction grating is configured to diffractively couple out the guided light portion according to a first diffraction order.

5. The near-eye display of claim 1, wherein a width of the eyebox is less than about twenty-five millimeters (25 mm).

6. The near-eye display of claim 1, wherein the eyebox is located at a distance from the light guide that is less than about twenty-five centimeters (25 cm).

7. The near-eye display of claim 1, wherein the diffraction grating comprises a plurality of diffraction grating segments separated by spaces, the diffraction grating segments of the plurality being configured to cooperatively concentrate the diffractively coupled-out light into the eyebox.

8. The near-eye display of claim 1, wherein the light concentrating backlight is optically transparent in a direction orthogonal to the light guide surface.

9. A near-eye display system comprising:
   a light guide configured to guide light according to a predetermined collimation factor;
   a diffraction grating optically coupled to the light guide, the diffraction grating being configured to diffractively couple out a portion of the guided light as diffractively coupled-out light and to concentrate the diffractively coupled-out light in an eyebox adjacent to a surface of the light guide; and
   a light valve array located between the light guide and the eyebox, the light valve array being configured to modulate the diffractively coupled-out light to form an image in the eyebox,
   wherein the formed image is configured to be viewable within the eyebox by a user, the predetermined collimation factor being configured to establish one or both of a predetermined width and a predetermined length of the eyebox.

10. The near-eye display system of claim 9, wherein the diffraction grating comprises diffractive features having a feature spacing between adjacent diffractive features that decreases with increasing distance from a light-entrance edge of the light guide.

11. The near-eye display system of claim 9, wherein the diffraction grating comprises a plurality of curved diffractive features configured to concentrate the diffractively coupled-out light in two orthogonal directions to provide the eyebox as a two-dimensional eyebox having both the predetermined width and the predetermined length.

12. The near-eye display system of claim 9, further comprising a light source optically coupled to a light-entrance edge of the light guide, the light source being configured to inject light into the light guide as the guided light with a predetermined collimation factor.

13. The near-eye display system of claim 9, further comprising another light valve array located between the light guide and the eyebox, the other light valve array being configured to further modulate the diffractively coupled-out light to form the image in the eyebox, wherein the further modulation of the diffractively coupled-out light is configured to provide eye accommodation cues to a user.

14. The near-eye display system of claim 13, wherein the other light valve array comprises a pixelated contact lens configured to be worn in an eye of the user, the pixelated contact lens having individual light valves that are operatively configured to control an amount of light that enters the user's eye when the user's eye is located within the eyebox.

15. The near-eye display system of claim 9, wherein the diffraction grating comprises a plurality of diffraction grating segments separated from one another by spaces, the plurality of diffraction grating segments being configured to cooperatively concentrate the diffractively coupled-out light into the eyebox.

16. The near-eye display system of claim 9, further comprising a headset configured to position the near-eye display system in front of an eye of a user as a head-mounted display, the near-eye display system being located by the headset to position the user's eye within the eyebox, wherein the near-eye display system is one of an augmented reality system and a virtual reality system.

17. The near-eye display system of claim 16, wherein the near-eye display system is optically transparent in a direction orthogonal to a propagation direction of the guided light within the light guide, the near-eye display system being the augmented reality system configured to superimpose the formed image on a view of a physical environment.

18. A method of near-eye display operation, the method comprising:
- guiding light in a light guide as guided light according to a predetermined collimation factor;
- concentrating light in an eyebox located adjacent to the light guide using a diffraction grating to diffractively couple out and direct a portion of the guided light into the eyebox; and
- modulating the concentrated light using a light valve array between the light guide and the eyebox to form an image within the eyebox,
- wherein one or both of an amount of light concentration provided by the diffraction grating and the predetermined collimation factor of the guided light is configured to determine a predetermined width of the eyebox.

19. The method of near-eye display operation of claim 18, further comprising optically coupling light provided by a light source into the light guide at a light-entrance edge as the guided light, wherein optically coupling light provides the guided light having the predetermined collimation factor.

20. The method of near-eye display operation of claim 18, wherein the diffraction grating comprises a plurality of curved diffractive features having a feature spacing that decreases with increasing distance from a light-entrance edge of the light guide, the decreasing feature spacing and curves of the plurality of curved diffractive features concentrating the diffractively coupled-out light in two orthogonal directions to provide a two-dimensional eyebox.

\* \* \* \* \*